United States Patent
Gori

(10) Patent No.: US 10,633,867 B2
(45) Date of Patent: Apr. 28, 2020

(54) GUTTER ASSESSMENT SYSTEMS AND METHOD

(71) Applicant: LEAFFILTER NORTH, LLC, Hudson, OH (US)

(72) Inventor: Michael Gori, Norton, OH (US)

(73) Assignee: LEAFFILTER NORTH, LLC, Hudson, OH (US)

( * ) Notice: Subject to any disclaimer, the term of this patent is extended or adjusted under 35 U.S.C. 154(b) by 0 days.

(21) Appl. No.: 16/380,301

(22) Filed: Apr. 10, 2019

(65) Prior Publication Data
US 2019/0368199 A1 Dec. 5, 2019

Related U.S. Application Data

(60) Provisional application No. 62/679,363, filed on Jun. 1, 2018.

(51) Int. Cl.
*E04D 13/064* (2006.01)
*G01B 3/14* (2006.01)

(52) U.S. Cl.
CPC ............. *E04D 13/064* (2013.01); *G01B 3/14* (2013.01)

(58) Field of Classification Search
CPC ................................ E04D 13/064; G01B 3/14
USPC ................. 33/562, 565, 566, 501.05, 501.45
See application file for complete search history.

(56) References Cited

U.S. PATENT DOCUMENTS

| | | | | |
|---|---|---|---|---|
| 1,881,651 A | * | 10/1932 | Judge | H02K 15/024 33/562 |
| 2,890,664 A | * | 6/1959 | Pollock | E04D 13/0643 52/11 |
| 3,222,792 A | * | 12/1965 | Eshom | E04F 21/04 33/526 |
| 4,757,649 A | | 7/1988 | Vahldieck | |
| 4,874,123 A | * | 10/1989 | Mercer, II | B25C 3/008 227/147 |
| 4,941,299 A | | 7/1990 | Sweers | |
| 4,945,642 A | * | 8/1990 | Saulietis | A41H 31/00 33/12 |
| 5,327,689 A | * | 7/1994 | Jansen | E04D 13/064 248/48.2 |
| 5,471,757 A | * | 12/1995 | McDonald | G01B 3/30 33/199 R |
| 5,555,680 A | | 9/1996 | Sweers | |
| 5,640,809 A | | 6/1997 | Iannelli | |
| 5,758,428 A | * | 6/1998 | Kotlinski | E04G 21/1891 33/416 |
| 6,073,398 A | | 6/2000 | Williams | |

(Continued)

*Primary Examiner* — Christopher W Fulton
(74) *Attorney, Agent, or Firm* — Benesch, Friedlander Coplan & Aronoff LLP

(57) ABSTRACT

The current disclosure describes components, systems, and methods for assessing the size and style of rain gutters. One embodiment is a kit that includes an extension rod and a plurality of measurement templates. The extension rod includes a pivotable head and a magnet. Each of the plurality of measurement templates includes a body and at least one metal component. The body of each measurement template is arranged such that it conforms to the inside or outside dimensions or contours of a rain gutter. The measurement templates are arranges to physically engage with rain gutters when assessing rain gutters. The measurement templates can assess K-style, half-round style, and fascia style rain gutters.

13 Claims, 33 Drawing Sheets

(56) References Cited

U.S. PATENT DOCUMENTS

| | | | |
|---|---|---|---|
| 6,249,985 B1 * | 6/2001 | Piko | B23Q 1/5406 33/503 |
| 6,286,224 B1 * | 9/2001 | Lewis | G01B 3/14 33/512 |
| 6,427,388 B1 | 8/2002 | Brochu | |
| 6,463,700 B2 | 10/2002 | Davis | |
| 6,598,352 B2 | 7/2003 | Higginbotham | |
| 6,732,477 B1 | 5/2004 | Richard | |
| 6,883,760 B2 | 4/2005 | Seise, Jr. | |
| 6,904,690 B2 * | 6/2005 | Bakke | G01B 3/34 33/1 H |
| 7,104,012 B1 | 9/2006 | Bayram | |
| 7,975,435 B2 | 7/2011 | Lenney et al. | |
| 8,104,230 B2 | 1/2012 | Gramling | |
| 8,176,687 B2 | 5/2012 | Roque Alonso | |
| 8,276,321 B2 | 10/2012 | Bell | |
| 8,375,644 B2 | 2/2013 | Robins | |
| 8,646,218 B1 | 2/2014 | Iannelli | |
| 8,925,253 B2 | 1/2015 | Bullinger | |
| 9,163,406 B1 | 10/2015 | Ealer, Sr. | |
| 9,212,490 B1 | 12/2015 | Ealer, Sr. | |
| 9,284,735 B2 | 3/2016 | Bryer et al. | |
| 9,404,266 B2 | 8/2016 | Yildiz | |
| 9,487,955 B2 | 11/2016 | Breyer et al. | |
| 9,683,371 B1 | 6/2017 | Nitch | |
| 9,791,255 B1 * | 10/2017 | Mills | E04D 13/0643 |
| 9,890,535 B2 | 2/2018 | Breyer et al. | |
| 2006/0179723 A1 | 8/2006 | Robins | |
| 2006/0230687 A1 | 10/2006 | Ealer, Sr. | |
| 2007/0074466 A1 | 4/2007 | Rasmussen | |
| 2008/0134587 A1 | 6/2008 | Ealer | |
| 2009/0205217 A1 * | 8/2009 | Wharton | B26B 29/06 33/565 |
| 2011/0138696 A1 | 6/2011 | Olson et al. | |
| 2012/0132759 A1 | 5/2012 | Sager | |
| 2013/0097943 A1 | 4/2013 | Higginbotham | |
| 2015/0259924 A1 | 9/2015 | Van Biber | |
| 2017/0204612 A1 | 7/2017 | Lenney | |

\* cited by examiner

GUTTER ASSESSMENT SYSTEMS AND METHOD

CROSS-REFERENCE TO RELATED APPLICATIONS

This application claims priority to pending U.S. Provisional Patent Application Ser. No. 62/679,363, titled "Gutter Assessment Systems" and filed on Jun. 1, 2018, which is expressly incorporated by reference herein in its entirety.

FIELD OF INVENTION

The present disclosure generally relates to components, systems, and methods for assessing gutters. More specifically, the present disclosure relates to a system of interchangeable components used to assess and determine the size and style of gutters installed on a structure such as a house or a building and methods of using such components and system.

BACKGROUND

Rain gutter systems are commonly used for residential homes, building, and other structures to manage rainwater by collecting the rainwater and channeling that rainwater away from the structure. Such management of rainwater can be critical for the overall maintenance and condition of the structure by reducing or eliminating damage to the structure and its foundation that can be caused by uncontrolled rainwater.

After such rain gutter systems are installed on structures, the rain gutter systems themselves may need maintenance or enhancements over time. For example, a component or section of a rain gutter system can be damage by high winds, hail, falling branches and trees, or other such adverse event and subsequently require repair. In another example, it may be desirable to enhance the efficacy of a rain gutter system with the addition of a gutter guard system. Gutter guard systems are often comprised of components or systems that are typically attached to or incorporated into rain gutter systems to prevent leaves, pine needles, branches, soot, shingle grit, and other such debris from entering the rain gutter. The selection of components and installation of a gutter guard system is dependent on the size and style of the rain gutter system. In any event, it is advantageous for a repairperson or installer to know the size and style of gutter that is to be repaired or enhanced. This is especially so when an installer needs to achieve a custom fit when installing a gutter guard system on a rain gutter system mounted on a building with unique structure and/or roofline requirements.

There are many different sizes and styles of rain gutters on the market in the United States and internationally. The differences in rain gutter sizes and styles are driven by a number of factors including different architectural styles for homes and buildings in different geographical regions and regional homebuilder and contractor trade practices that develop over time. Such different architectural styles can also be driven by differences in climate and weather patterns (for example, annual rain and snow fall), historical influences, availability of building materials, and so on.

Three styles of rain gutters make up a majority of the market—"K-style" gutters, "half-round gutters," and "fascia-style" gutters. FIG. 1 illustrates an exemplary K-style gutter 10. Typically, K-style gutters have a generally flat back section 12 that engages the structure and a flat bottom section 14 extending away from the structure that is generally perpendicular to the back section 12. A front section 16 extends upward and angles away from the bottom section 14 such that it forms an obtuse angle between the bottom section 14 and front section 16. The front section 16 typically includes a front lip 18 that is curled inward toward the interior of the gutter 10. The back section 12 also includes a rear edge or lip 20 that is slightly bent outward. Sizes for K-style gutters 10 are determined by the approximate distance from the front lip 18 of the front section 16 to the rear lip 20 of the back section 12, and typically come in sizes from about four inches to about seven inches, with the five inch and six inch variations being the most common.

FIGS. 2 and 3 illustrates exemplary half-round gutters 30, 50. As its name implies, a half-round gutter includes a body 32, 52 that is shaped as approximately a half-section of a tube. The half-round gutter 30, 50 is installed such that a back portion 34, 54 of the gutter 30, 50 is typically spaced apart from the structure due to connecting hardware. Such connecting hardware is typically inserted between the structure and the gutter 30, 50 so as to cause a slight relief for structure. However, there are also embodiments where an installed half-round gutter 30, 50 is installed such that the half-round gutter 30, 50 is in contact with the structure. In either embodiment the half-round gutter typically has a reinforced rear lip or hem 36, 56 as part of the back portion 34, 54 which is typically positioned just under the roofline of the structure. A front portion 38, 58 of the gutter 30, 50 typically includes a front lip 40, 60. In one example, as illustrated in FIG. 2, the front lip 40 can be arranged such that it curls inward toward the interior of the gutter 30. Such an arrangement is commonly referred to as a reverse curve half-round gutter. In another example, as illustrated in FIG. 3, the front lip 60 can be arranged such that it curls outward away from the interior of the gutter 50. Such an arrangement is commonly referred to as a standard half-round gutter. Sizes for half-round gutters 30, 50 are determined by the approximate distance from the front lip 40, 60 of the front section to the reinforced rear lip or hem 36, 56 of the back section 34, 54 and typically come in sizes from about four inches to about eight inches, with five and six inch variations common for standard half-round gutters and the reverse curve half-round gutters being more common in the six inch variation.

FIG. 4 illustrates an exemplary fascia-style gutter 80. Fascia-style gutters 80 are typically secured to rafter tails of the structure or roofline. Typically, fascia-style gutters 80 have a generally flat back section 82 that engages the rater tail or other similar portion of the structure and/or roofline. Optionally, the back section 82 can include an extended edge 84 protruding from the back section 82 (as illustrated in FIG. 4), which can be referred to in the industry as a "winged" or "winged-backed" fascia gutter. A bottom section 86 extends generally perpendicular away from the back section 82, and is generally shorter than the bottom section of a K-style gutter. A front section 88 extends upward and angles away from the bottom section 86 such that it forms an obtuse angle between the bottom section 86 and front section 88. This obtuse angle is generally larger than the similarly situated angle in a K-style gutter. The front section 88 typically includes a front lip 90 that is bent inward toward the interior of the gutter 80. Sizes for fascia-style gutters are determined by the approximate distance from the front lip 90 of the front section 88 to the back section 82, and typically come in sizes from about four inches to about six inches.

As will be appreciated, to make repairs to a rain gutter system or to install a gutter guard system, it can be difficult and time consuming for a repairperson, installer or salesperson to move to a position proximate to the rain gutter system where the repairperson, installer, or salesperson can physically measure the gutters that need repair or enhancement. It is advantageous if the repairperson, installer, or salesperson can assess the size and style of the rain gutter from the ground level. Thus, there is a need for components, systems, and methods for accurately assessing and determining the size and style of already installed rain gutter system from a generally remote position.

SUMMARY

The current disclosure describes components, systems and methods for assessing the size and style of rain gutters. One embodiment is a kit that includes an extension rod and a plurality of measurement templates. The extension rod includes a pivotable head and a magnet. Each of the plurality of measurement templates includes a body and at least one metal component. The body of each measurement template is arranged such that it conforms to the inside or outside dimensions and contours of a rain gutter. The measurement templates are arranged to physically engage with rain gutters when assessing rain gutters. The measurement templates can assess various sizes of K-style, half-round style, and fascia style rain gutters. However, it will be understood that based on the principles and teachings disclosed herein, measurement templates can be developed for any size or style of rain gutter.

In another embodiment, a method of assessing rain gutters includes the steps of: providing a plurality of templates for assessing a variety of rain gutters; providing an extension rod; securing a first template of the plurality of templates to the extension rod; engaging the first template with the rain gutter; observing the engagement of the first template with the rain gutter; and determining if the first template conforms to contours of the rain gutter. In such a method, the plurality of templates can include at least one template for assessing each of the following styles of rain gutter—a K-style rain gutter, a fascia style rain gutter, a standard half-round rain gutter, and a half-round reverse curve rain gutter. The plurality of templates can include at least one template for assessing sizes of gutters ranging from four inches to seven inches in size. In one implementation of the method, the step of securing a first template of the plurality of templates to the extension rod includes placing a metal component secured to the first template in contact with the magnet connected to the extension rod.

BRIEF DESCRIPTION OF THE DRAWINGS

In the accompanying drawings, structures are illustrated that, together with the detailed description provided below, describe example embodiments of the disclosed systems, methods, and components. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

Figure 1:
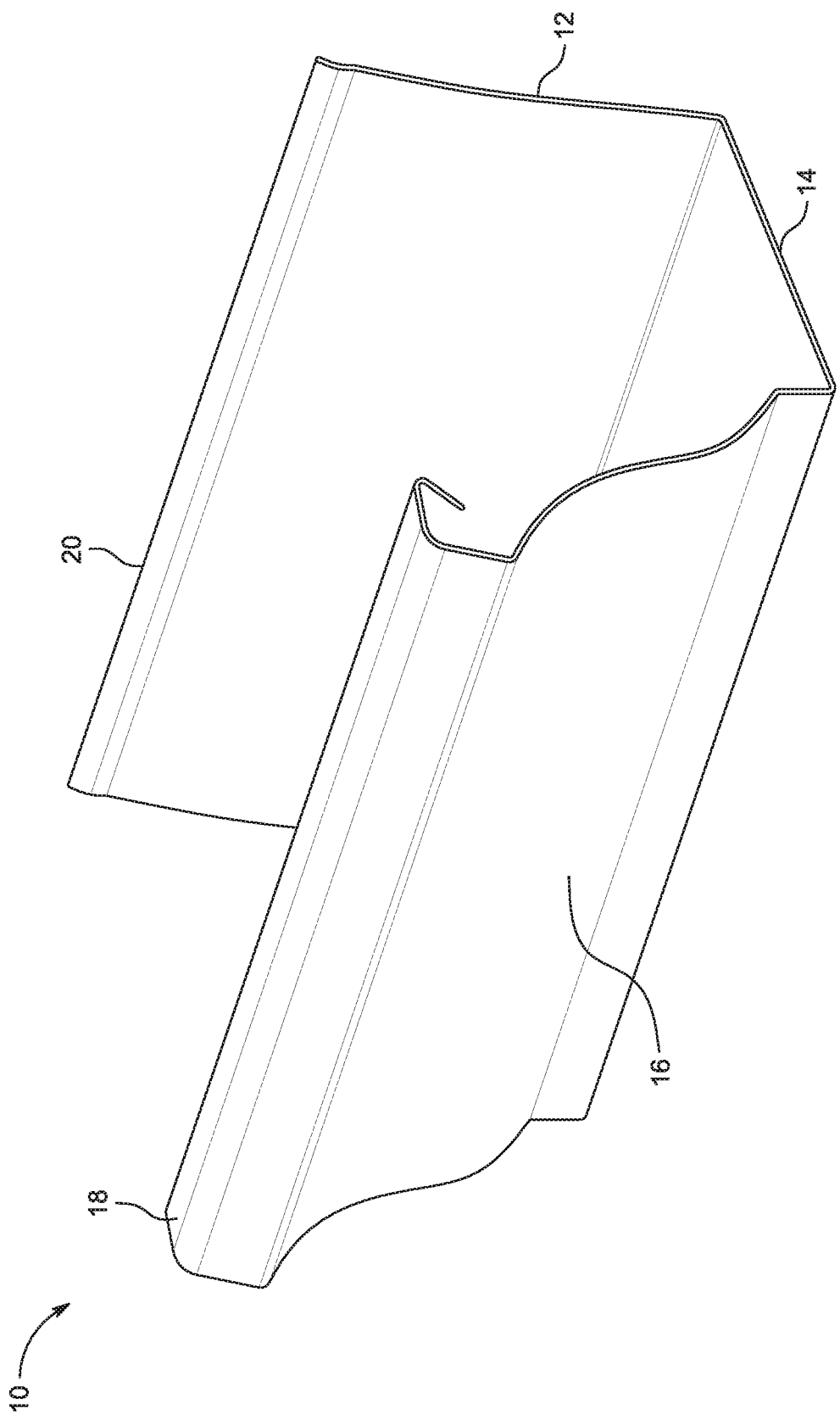
FIG. 1 schematically illustrates a perspective view of an exemplary K-style gutter.

The components, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of a gutter assessment components and systems and methods of using such components and systems are hereinafter disclosed and described in detail with reference made to FIGS. 1-34.

As will be described in detail herein, an exemplary embodiment of a gutter assessment system includes a number of interchangeable measurement templates and an extension rod. As will be individually discussed herein, each of the interchangeable measurement templates are designed to engage with a gutter to assess both the size and style of a particular gutter. The extension rod is designed such that its overall length can be selectively adjusted. The extension rod is further designed such that measurement templates can be reversibly secured to the extension rod. Furthermore, the length of the extension rod is sufficiently extendable such that the measurement template can engage with a gutter that is substantially above the location of a repairperson, installer, or salesperson. For example, a repairperson, installer, or salesperson can secure a specific measurement template to the extension rod, extend the extension rod as required to reach a gutter that is elevated above the ground, engage the measurement template with the gutter, observe the engagement, retract the extension rod, and remove the measurement template from the extension rod. Such a processes can be repeated if the initial measurement template is not the measurement template that is useful in determining the size and style of the gutter.

FIGS. 5-6 and 15-28 illustrate a series of exemplary measurement templates that accommodate different sizes and styles of rain gutters. Typically, there are a pair of measurement templates for each size and style of rain gutter: an inside template and an outside template. The inside template is designed to engage with a rain gutter such that the inside template can be compared to the rain gutter to determine if it matches the inside dimension and contours of the rain gutter. As will be subsequently discussed herein, the endcap of a rain gutter is often designed to mimic the inside dimensions of the rain gutter such that an inside template can be engaged with an endcap to determine if the inside template matches the inside dimension and contours of the rain gutter. The outside template is designed to engage with a rain gutter such that the outside template can be compared to the rain gutter to determine if it matches the outside dimension and contours of the rain gutter. The outside template can be used as a redundant check to confirm the assessment made using the inside template. Additionally, the outside template can be used for roof structures that do not provide for rain gutter systems that include endcaps. For example, rain gutter systems for hip style rooflines typically do not use endcaps because the roofline requires a series of mitered corners to form a generally continuous rain gutter system along the entire roofline.

Figure 5:
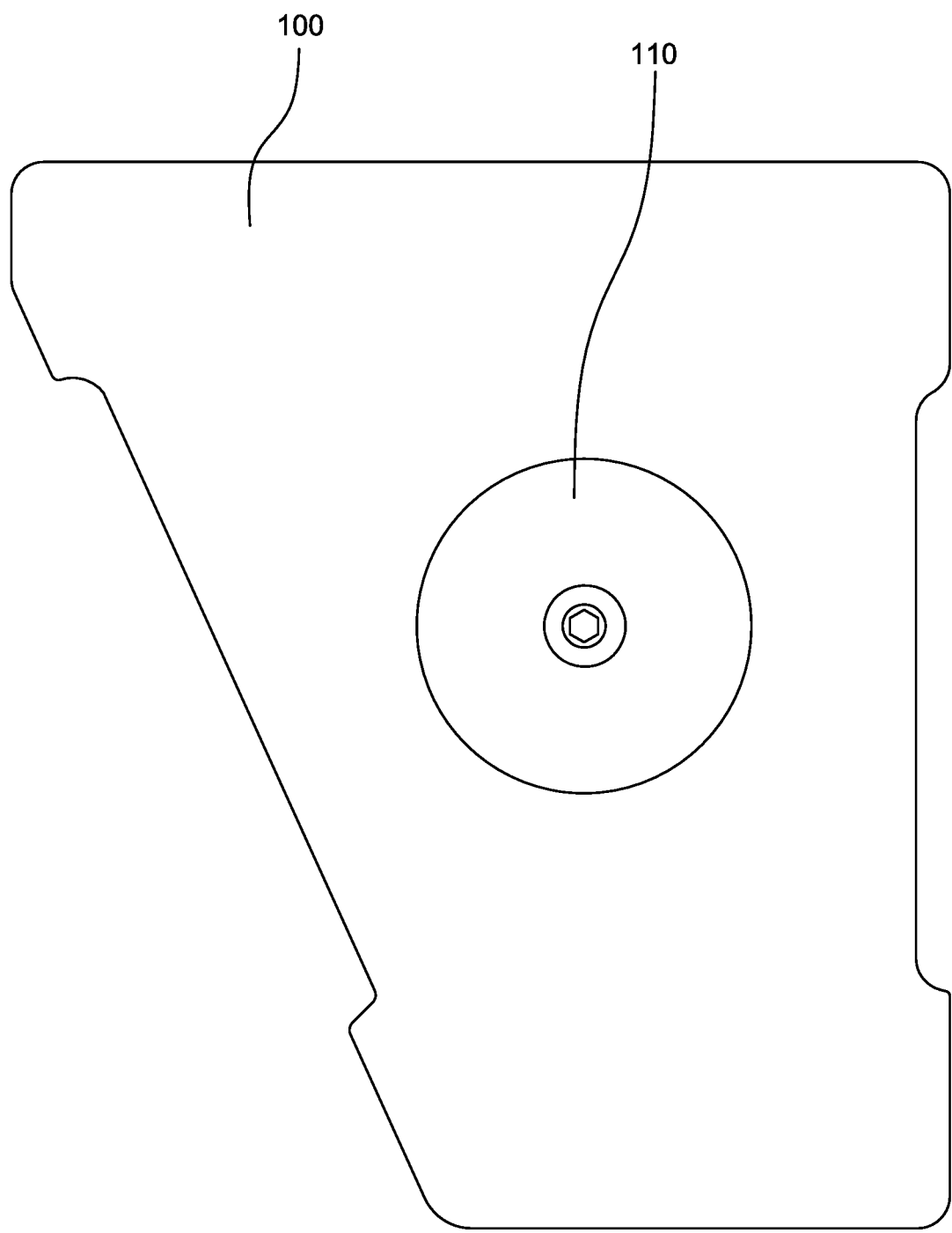
FIG. 5 is a photograph depicting a 4-inch fascia style inside template.
Figure 6:
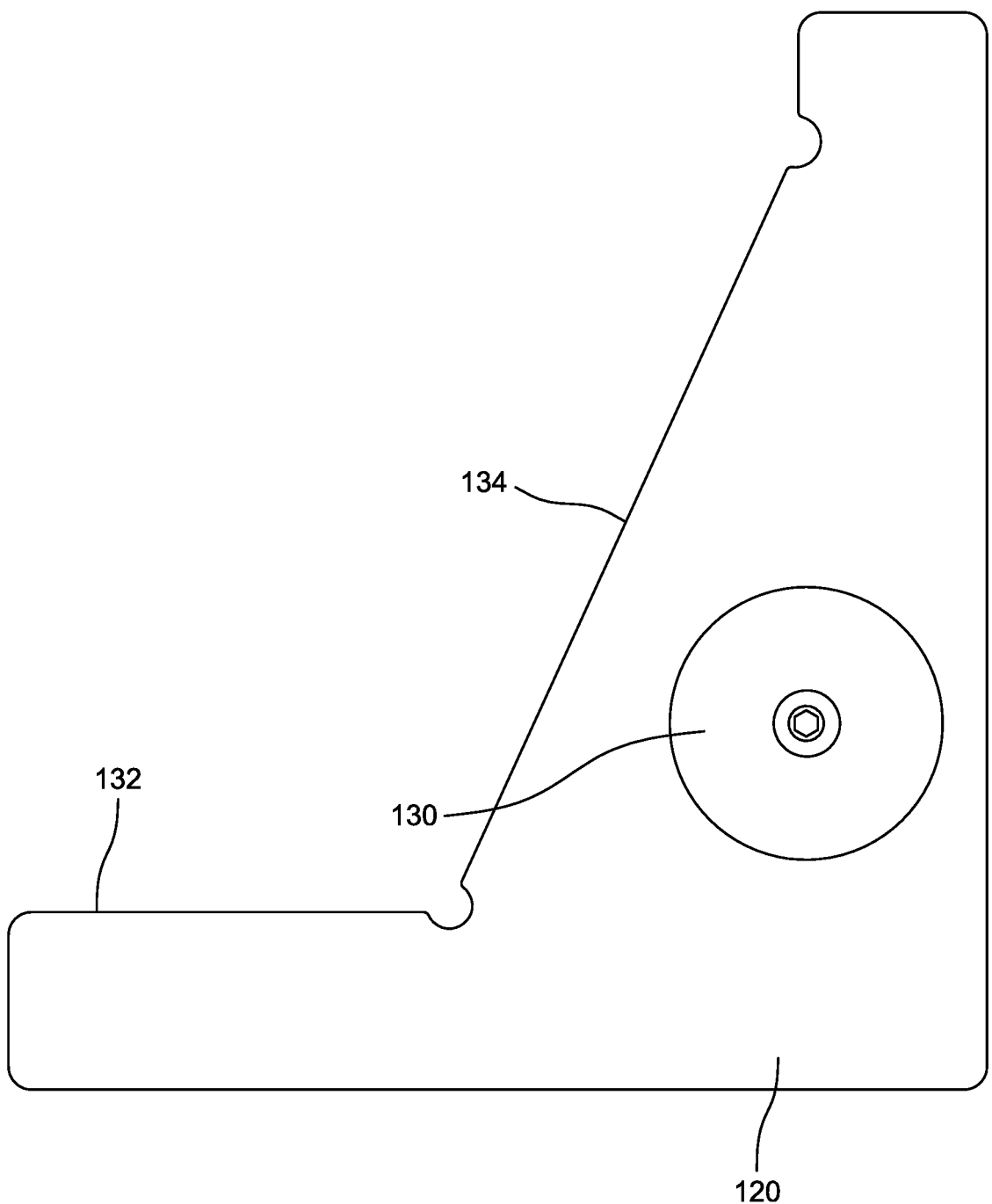
FIG. 6 is a photograph depicting a 4-inch fascia style outside template.

FIG. 5 is an inside template 100 for a 4-inch fascia style gutter, and FIG. 6 is an outside template 120 for a 4-inch fascia style gutter. The 4-inch fascia style inside template 100 is designed such that the perimeter of the inside template 100 mimics the inside dimension and contours of a 4-inch fascia style rain gutter. As will be further discussed, the 4-inch fascia style inside template 100 includes at least one metal component 110 secured to the 4-inch fascia style inside template 100. The 4-inch fascia style outside template 120, illustrated in FIG. 6, is designed such that portions of the perimeter 132 and 134 mimics the outside dimension and contours of a 4-inch fascia style rain gutter. The 4-inch fascia style outside template 120 includes at least one metal component 130 secured to the 4-inch fascia style outside template 120. As will be described below, the metal components 110, 130 are useful in reversibly securing the measurement template 100, 120 to an extension rod.

Figure 7:
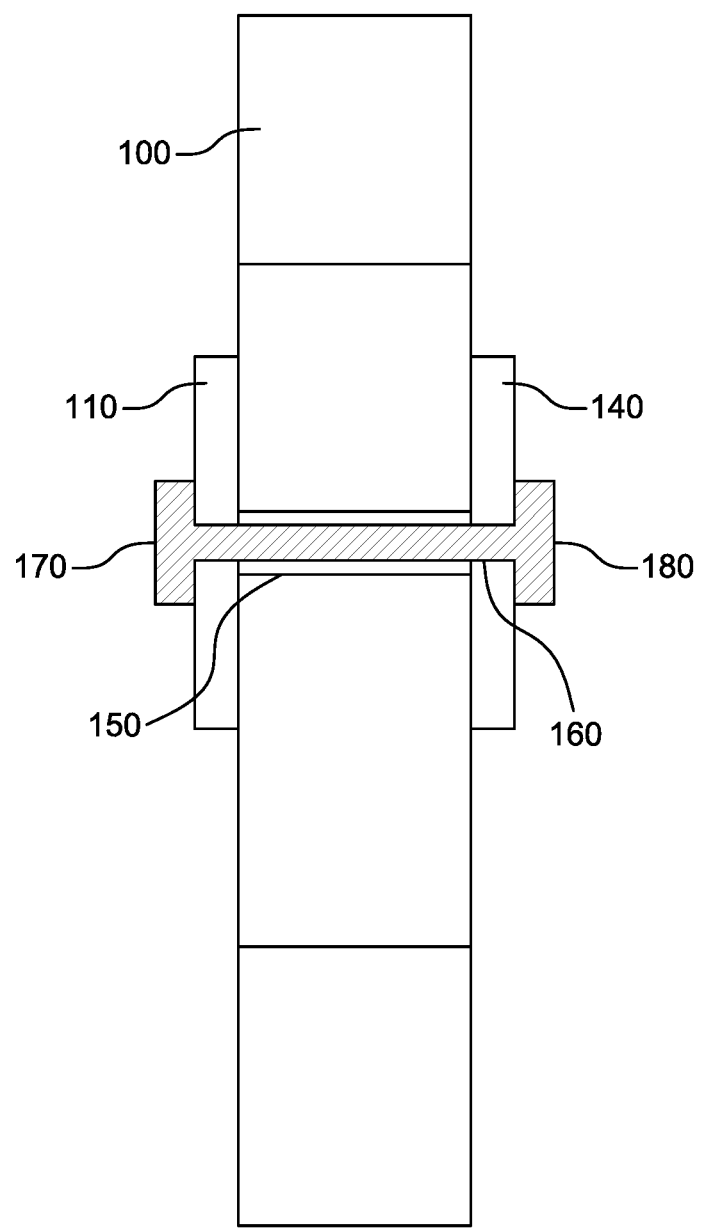
FIG. 7 schematically illustrates a cross-sectional view of the 4-inch fascia style inside template of FIG. 5.

As illustrated schematically in FIG. 7, the measurement templates can include a pair of metal components, one on each main face, secured to the measurement template. Such an arrangement provides for the measurement template to be universal in that the measurement template can be used to assess a rain gutter regardless of whether it is more convenient for the repairperson, installer, or salesperson to assess the rain gutter with the right side of their body facing the structure or whether it is more convenient for the repairperson, installer, or salesperson to assess the rain gutter with the left side of their body facing the structure. Furthermore, for "inside" templates (such as the 4-inch fascia style inside template 100), the universal nature of the pair of metal components secured to each main face of the template provides for the flexibility of measuring a gutter using any endcap in the rain gutter system. As will be appreciated, a rain gutter system can have a "left" endcap at one side of a rain gutter and a "right" endcap at the other side of the rain gutter. The design of the inside templates allows the inside template to be used to assess a gutter using either its left endcap or its right endcap.

FIG. 7 illustrates a cross-section view of the 4-inch fascia style inside template 100 of FIG. 5. The 4-inch fascia style inside template 100 includes a first metal component 110 on a first face of the inside template 100 and a second metal component 140 on a second and opposite face of the inside template 100. The inside template 100 includes an aperture 150 passing through the body of the inside template 100 that accommodates a fastener 160 that passes through the body of the inside template 100. A pair of securing components 170, 180 are secured to either end of the fastener 160, thus, securing the metal components 110, 140 to the inside template 100.

As will be understood, the fastener 160 can be a threaded rod, bolt, or other such fastener. In the instance where the fastener 160 is a threaded rod, the securing components 170, 180 can be nuts that are threaded onto the threaded rod to secure the metal components 110, 140 to the inside template 100. In the instance where the fastener 160 is a bolt, the head of the bolt can serve as one of the securing components 170, and a nut can serve as the other securing component 180. It will be understood that the fastener 160 may not require securing components such as a friction fit pin or peg or a tension tie. Additionally, it will be understood that the securing components 170, 180 can be rivets and other such mechanical devices. It will be further understood that metal components may be secured to measurement templates through other methods such as adhesives, stamping, embedding, molding, etc. It will be further understood that although the securing of metal components 110, 140 is described and illustrated only with the 4-inch fascia style inside template 100, such method of securing metal components is applicable to both inside templates and outside templates as well as templates for any size or style of gutter.

Figure 8:
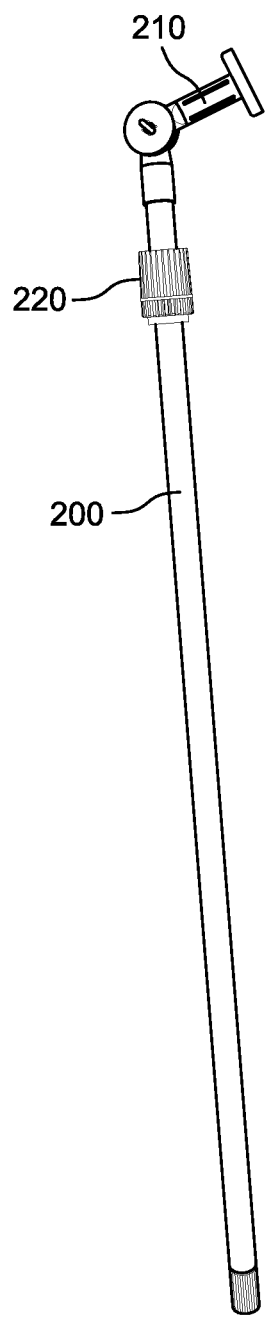
FIG. 8 is a photograph depicting an extension rod in a retracted position.
Figure 9:
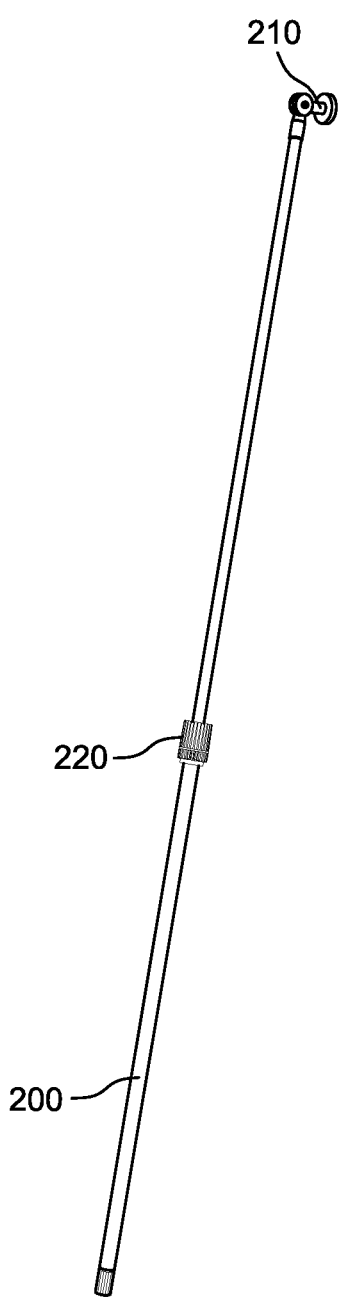
FIG. 9 is a photograph depicting an extension rod in an extended position.
Figure 10:
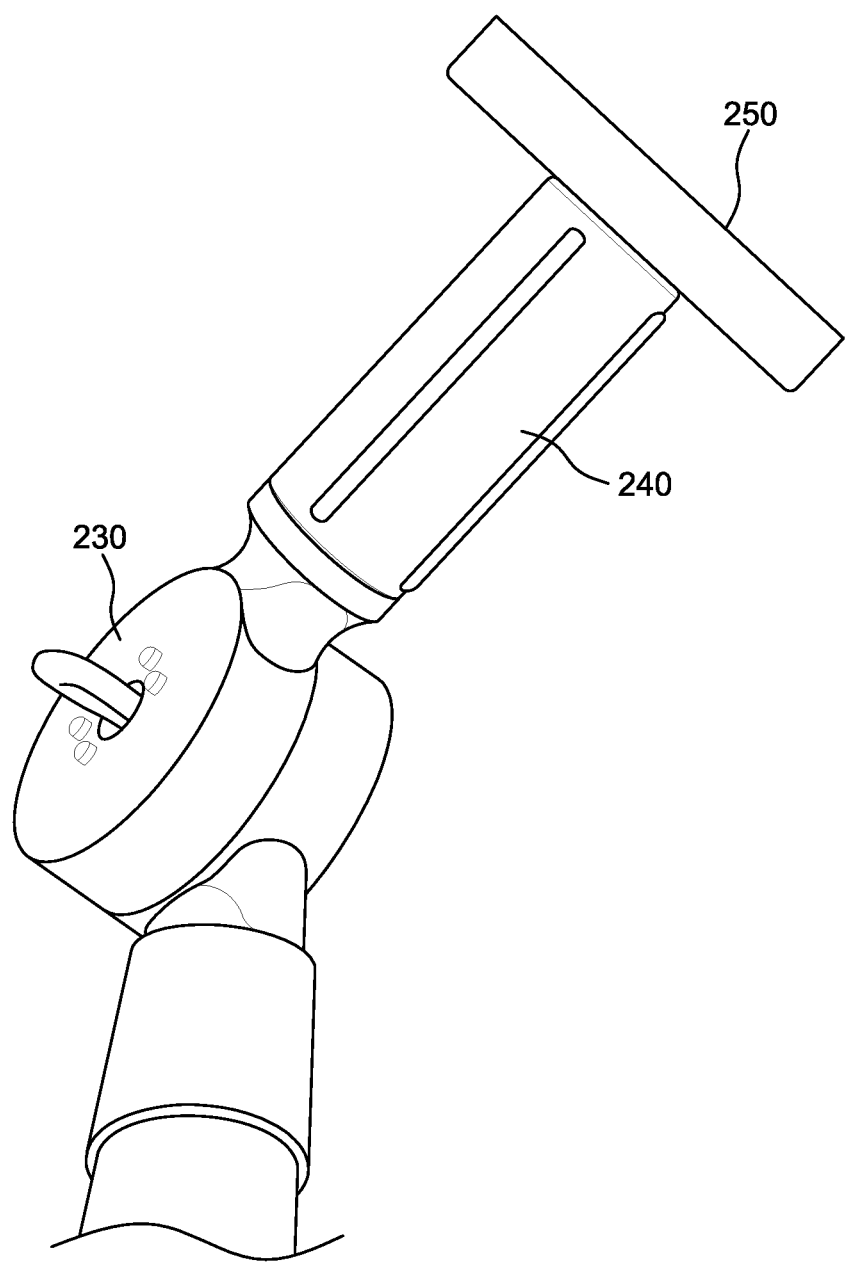
FIG. 10 is a photograph of the head of the extension rod of FIG. 8.
Figure 11:
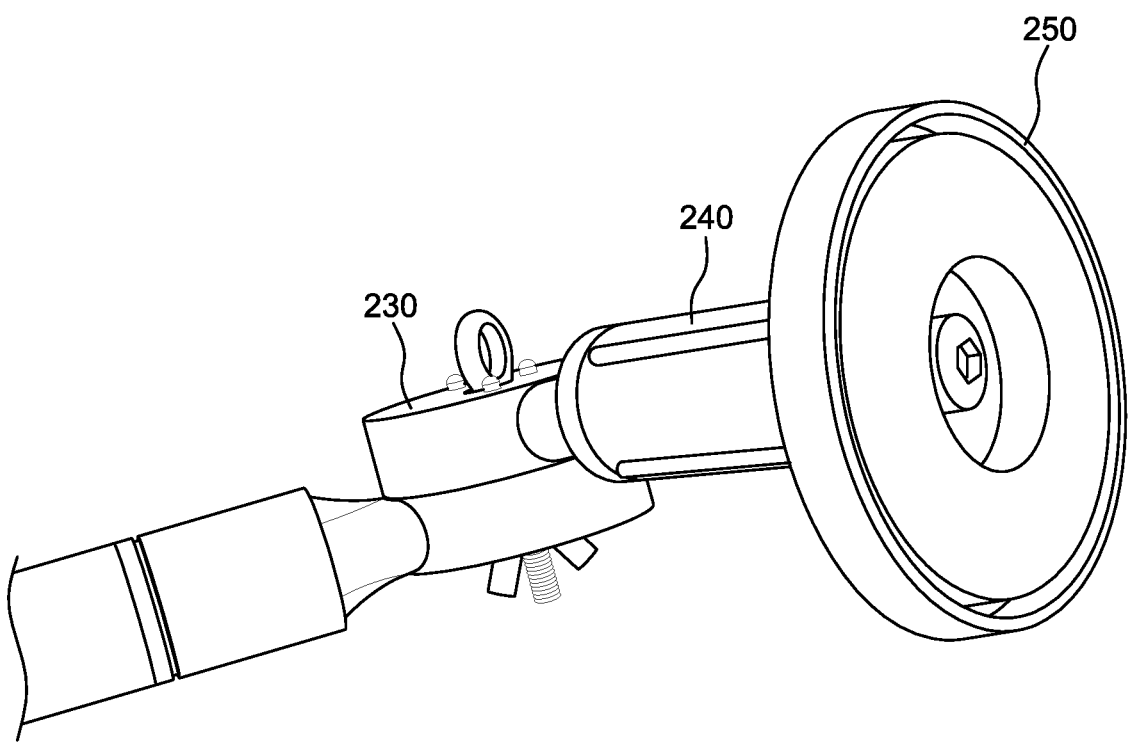
FIG. 11 is another photograph of the head of the extension rod of FIG. 8.

FIGS. 8-10 illustrate an exemplary extension rod 200 for use with the measurement templates. FIG. 8 illustrates the extension rod 200 in a fully retracted position (i.e., generally in its shortest arrangement), and FIG. 9 illustrates the extension rod 200 in a fully extended position (i.e., generally in its longest arrangement). The extension rod 200 includes a head 210 and a coupler 220, where the coupler 220 can be manually tightened and loosened. When the coupler 220 is loosened, the length of the extension rod 200 can be expanded or shortened. When the coupler 220 is tightened, the length of the extension rod 200 is generally fixed. FIGS. 10 and 11 illustrate the head 210 of the extension rod 200. The head includes a pivot feature 230, an arm 240, and a magnet 250. The pivot feature 230 can be tightened and loosened to adjust the angle of the arm 240 and magnet 250 relative to the shaft of the extension rod 200. The arm 240 connects the pivot to the magnet 250.

Figure 12:
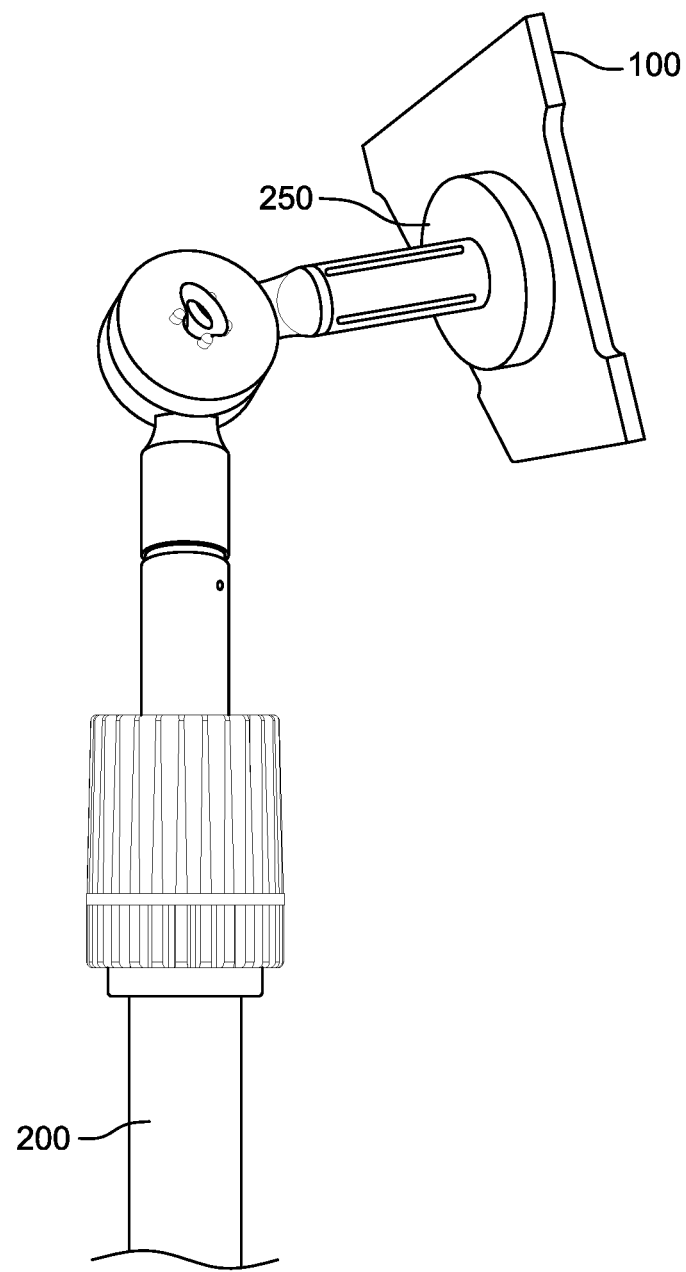
FIG. 12 is a photograph of a measurement template attached to an extension rod.
Figure 13:
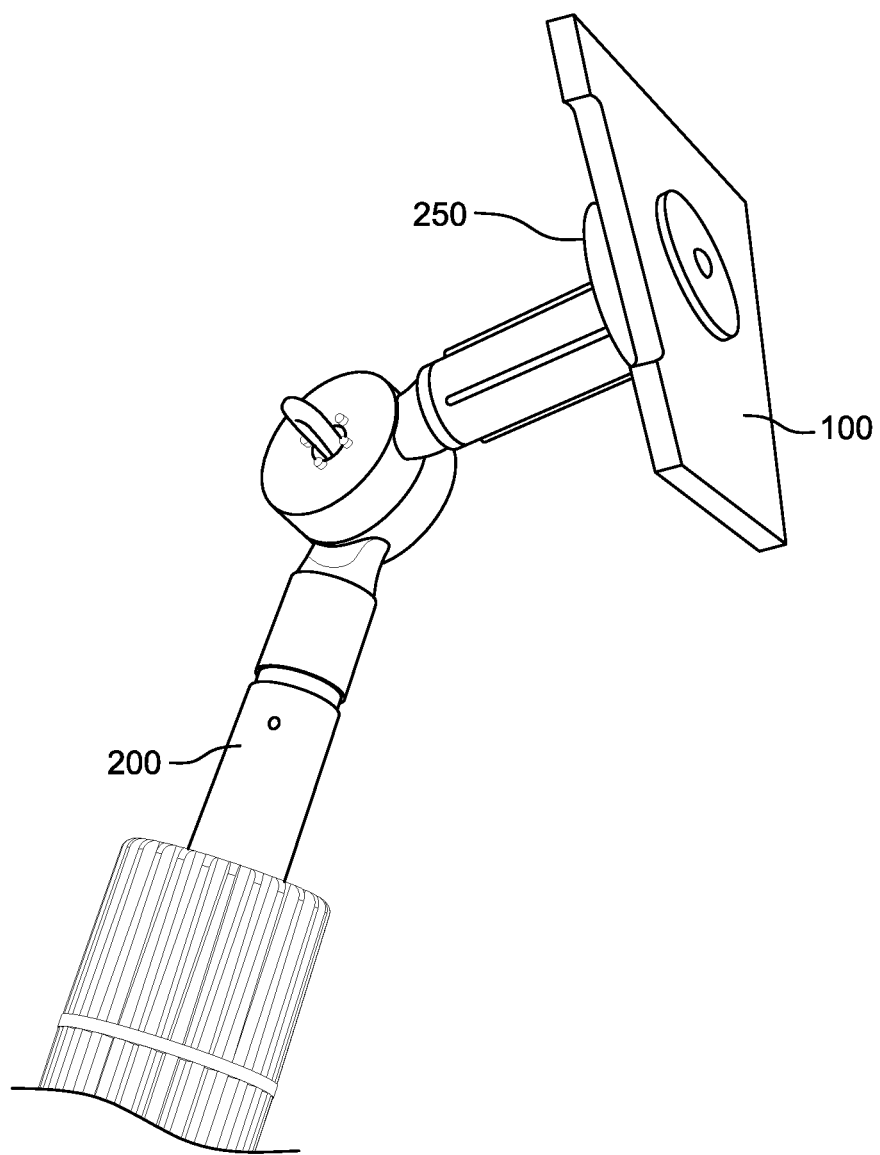
FIG. 13 is another photograph of a measurement template attached to an extension rod.
Figure 14:
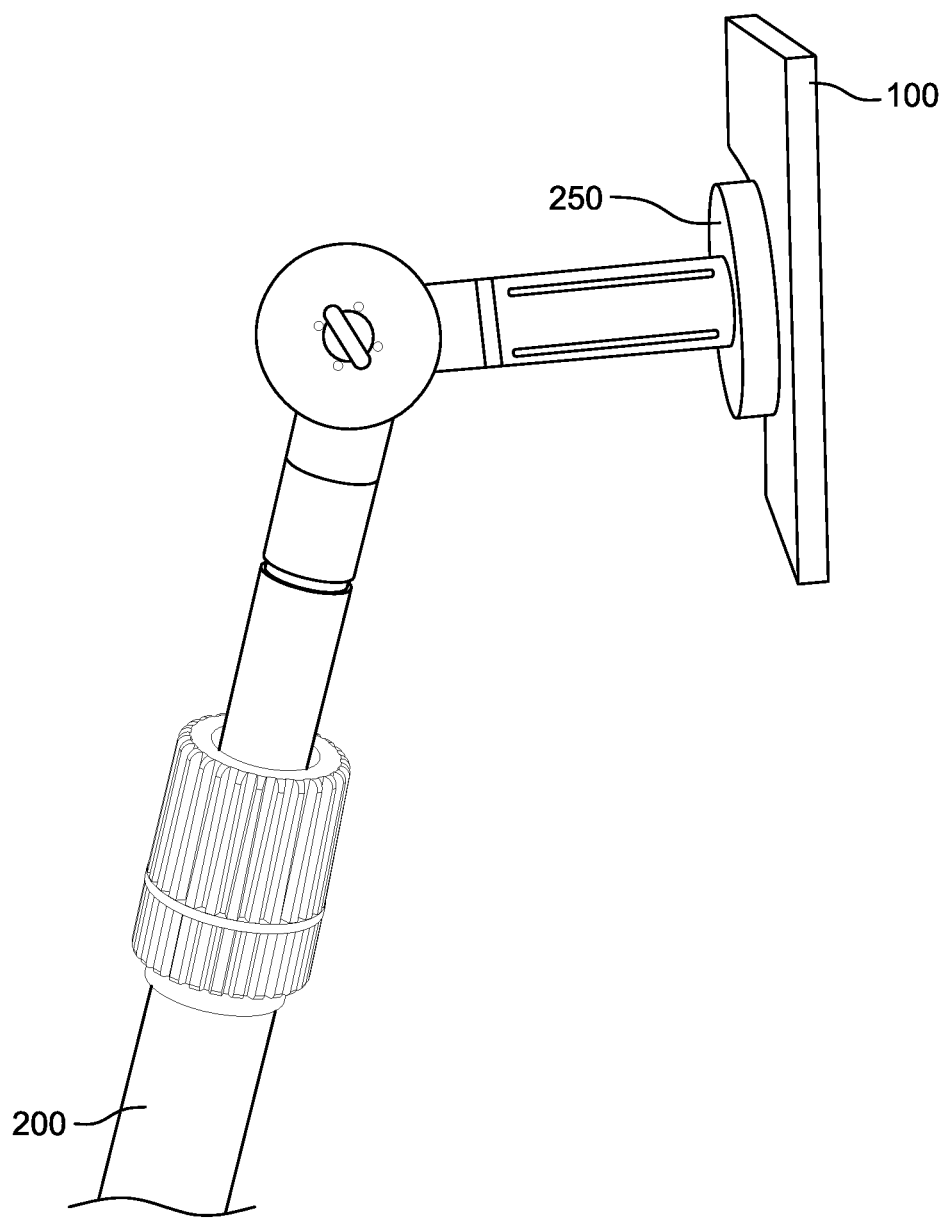
FIG. 14 is yet another photograph of a measurement template attached to an extension rod.

FIGS. 12-14 illustrate the 4-inch fascia inside template 100 secured to the head 210 of the extension rod 200. The 4-inch fascia inside template 100 is secured to the head 210 of the extension rod 200 by engaging the magnet 250 with one of the metal components 110, 140 of the 4-inch fascia inside template 100. Such an arrangement makes it practical and efficient for a repairperson, installer, or salesperson to quickly engage and disengage a measurement template to the extension rod 200, which makes it practical and efficient for a repairperson, installer, or salesperson to quickly and conveniently use numerous measurement templates to assess and determine the size and style of a rain gutter that is installed on a structure. The arrangement of the metal components 110, 140 and the magnet 250 form an attachment mechanism that allows for the measurement template to rotate relative to the extension rod 200 during use. Such rotation allows the repairperson, installer, or salesperson the flexibility to assess the rain gutter with the extension rod 200 positioned at a variety of angles and/or orientations to the rain gutter system. Such flexibility allows the repairperson, installer, or salesperson to more easily complete the assessment of the rain gutters even when common impediments, such as bushes, trees, porches, air conditioning units, and the like, may be positioned below sections of the rain gutter that would otherwise obstruct the repairperson's, installer's, or salesperson's access to the rain gutters.

It will be understood that the arrangement of a pair of metal components 110, 140 attached to each measurement template and a magnet 250 attached to the extension rod 200 is only one possible mechanism for reversibly securing measurement templates to extension rods. Other possible mechanisms include, but are not limited to, snaps, clips, hooks, slot and tab combinations, hook and loop system (i.e., Velcro®), straps, and other similar mechanism.

Figure 15:
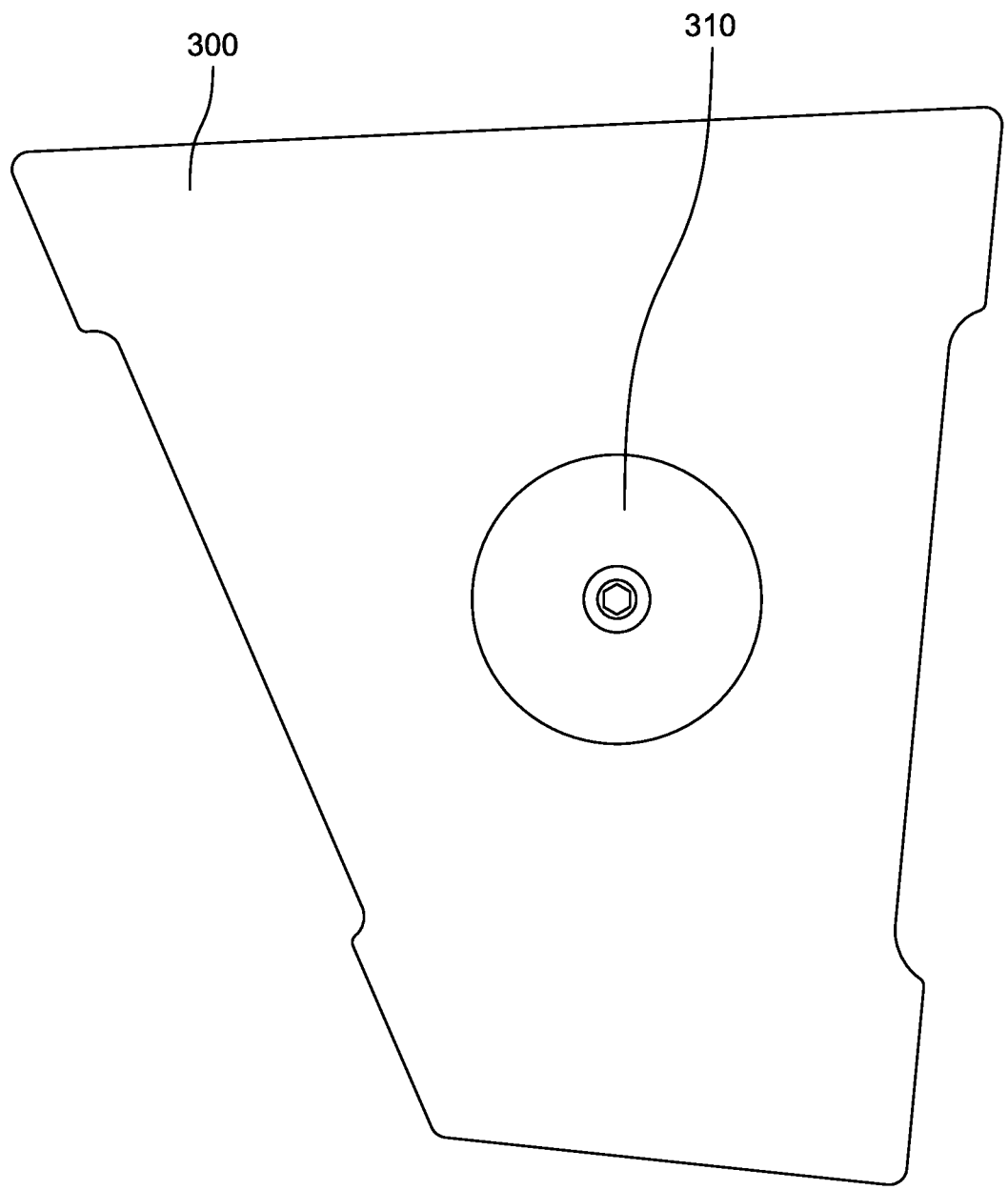
FIG. 15 is a photograph depicting a 4.5-inch fascia style inside template.
Figure 16:
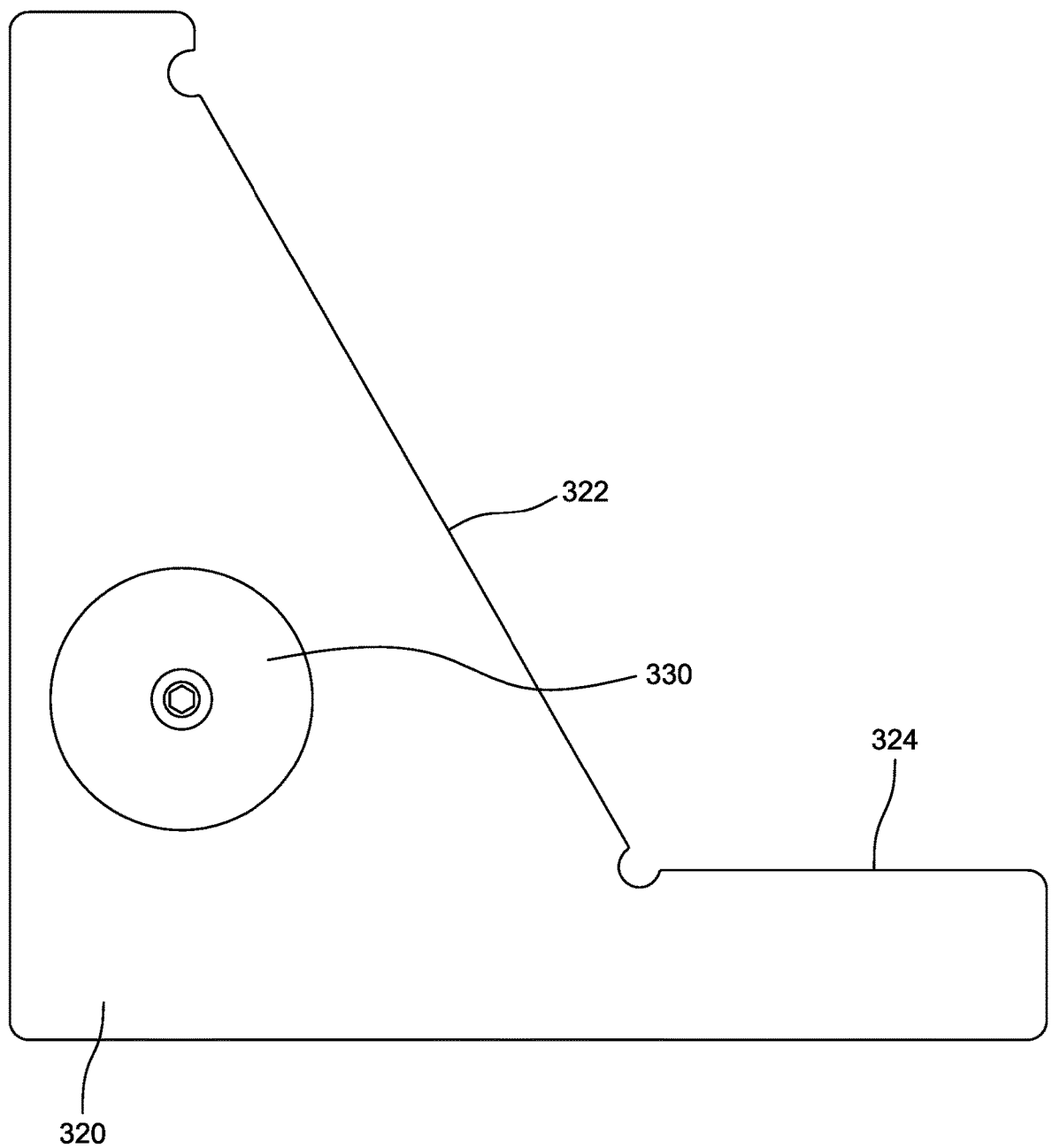
FIG. 16 is a photograph depicting a 4.5-inch fascia style outside template.

FIG. 15 is an inside template 300 for a 4.5-inch fascia style gutter, and FIG. 16 is an outside template 320 for a 4.5 inch fascia style gutter. The 4.5-inch fascia style inside template 300 is designed such that the perimeter of the inside template 300 mimics the inside dimension and contours of a 4.5-inch fascia style rain gutter. The 4.5-inch fascia style inside template 300 includes at least one metal component 310 secured to the 4.5-inch fascia style inside template 300. The 4.5-inch fascia style outside template 320 is designed such that portions of the perimeter 322 and 324 mimic the outside dimension and contours of a 4.5-inch fascia style rain gutter. The 4.5-inch fascia style outside template 320 includes at least one metal component 330 secured to the 4.5-inch fascia style outside template 320. As is described herein, the metal components 310, 330 are useful in reversibly securing the measurement template 300, 320 to an extension rod 200 via the magnet 250.

Figure 17:
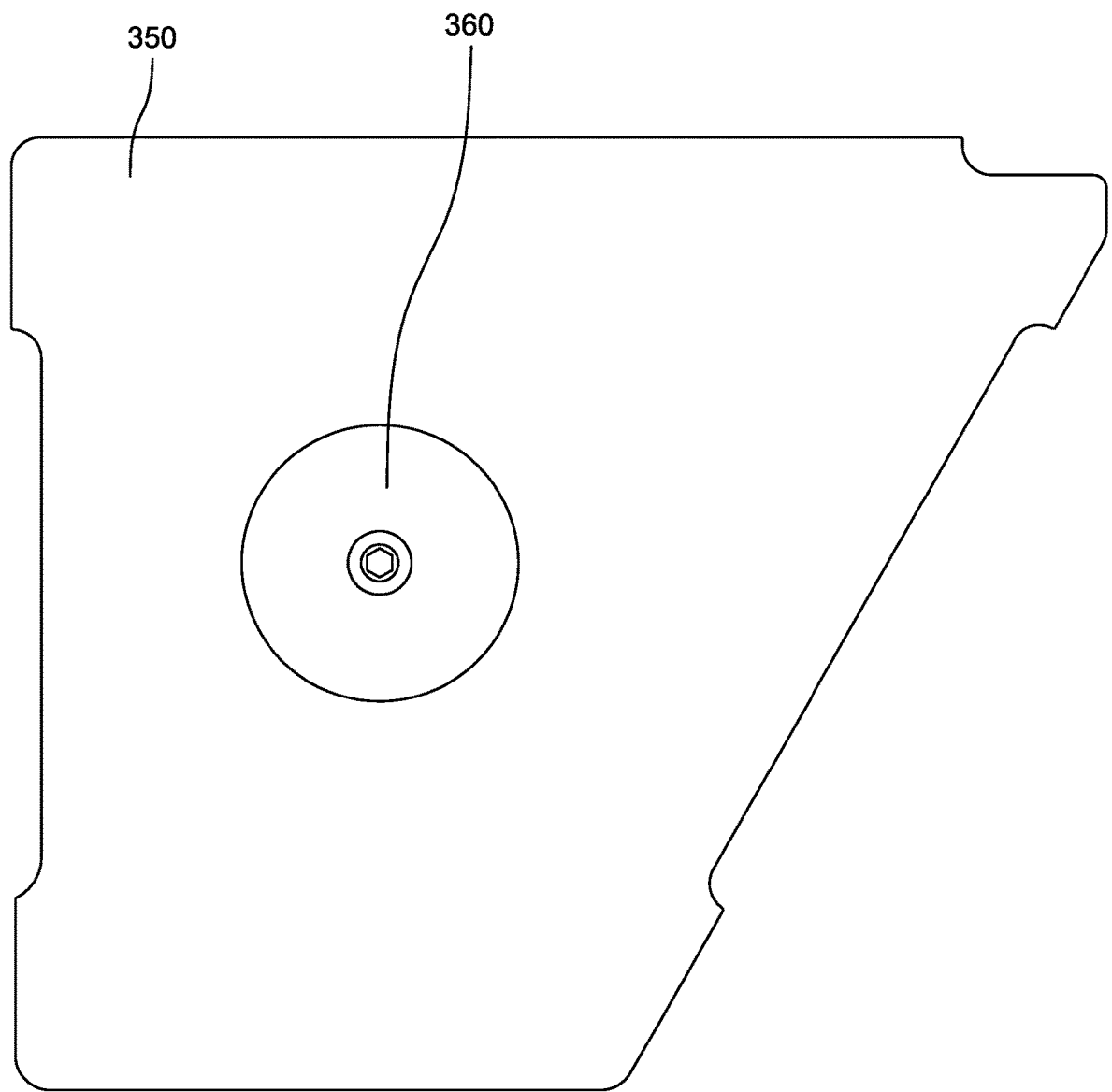
FIG. 17 is a photograph depicting a 5.5-inch fascia style inside template.
Figure 18:
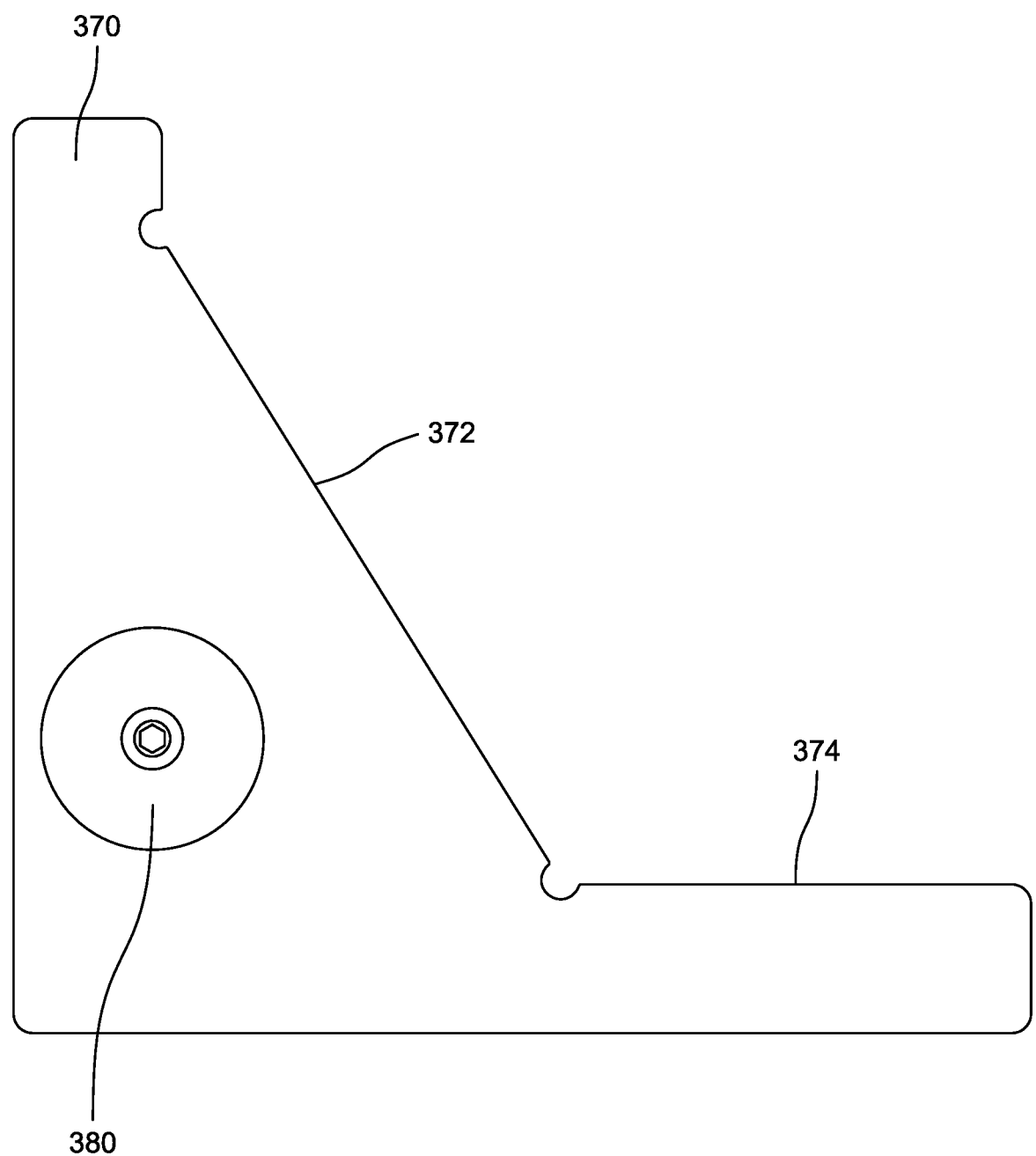
FIG. 18 is a photograph depicting a 5.5-inch fascia style outside template.

FIG. 17 is an inside template 350 for a 5.5-inch fascia style gutter, and FIG. 18 is an outside template 370 for a 5.5 inch fascia style gutter. The 5.5-inch fascia style inside template 350 is designed such that the perimeter of the inside template 350 mimics the inside dimension and contours of a 5.5-inch fascia style rain gutter. The 5.5-inch fascia style inside template 350 includes at least one metal component 360 secured to the 5.5-inch fascia style inside template 350. The 5.5-inch fascia style outside template 370 is designed such that portions of the perimeter 372 and 374 mimic the outside dimension and contours of a 5.5-inch fascia style rain gutter. The 5.5-inch fascia style outside template 370 includes at least one metal component 380 secured to the 5.5-inch fascia style outside template 370. As is described herein, the metal components 360, 380 are useful in reversibly securing the measurement template 350, 370 to an extension rod 200 via the magnet 250.

Figure 19:
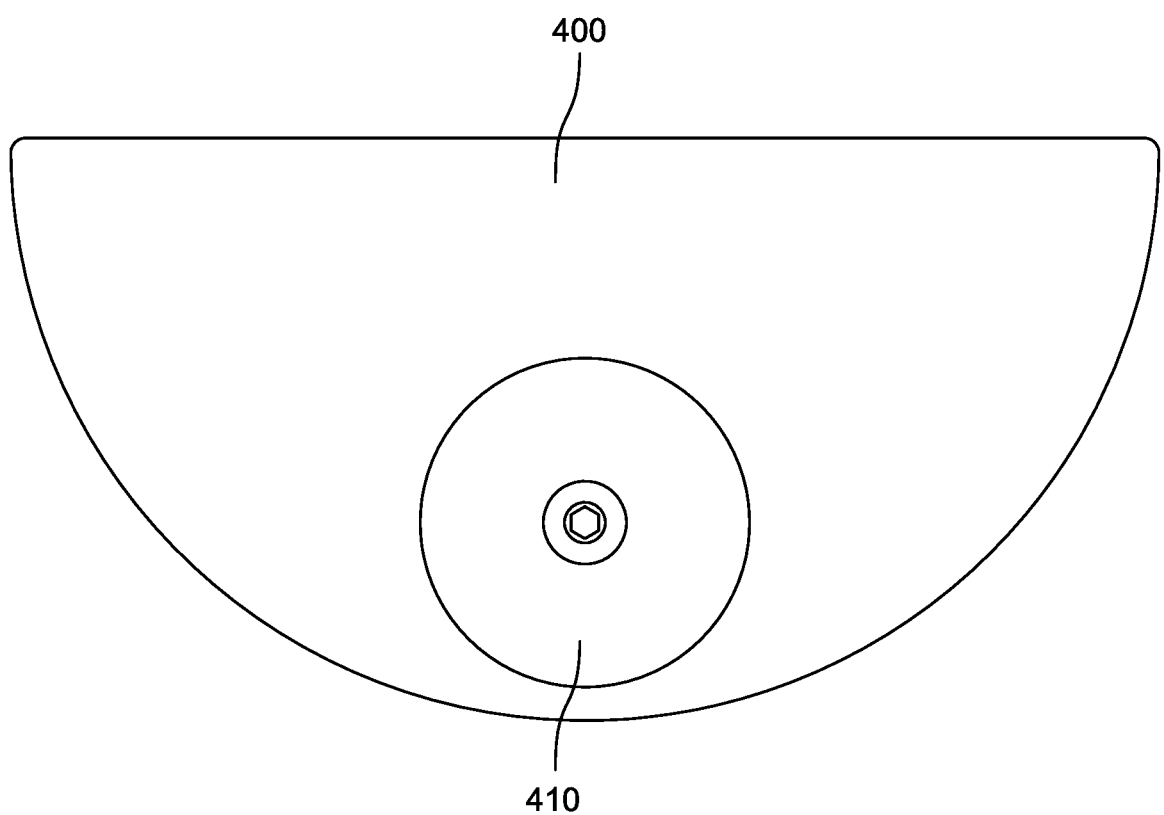
FIG. 19 is a photograph depicting a 5-inch standard half-round inside template.
Figure 20:
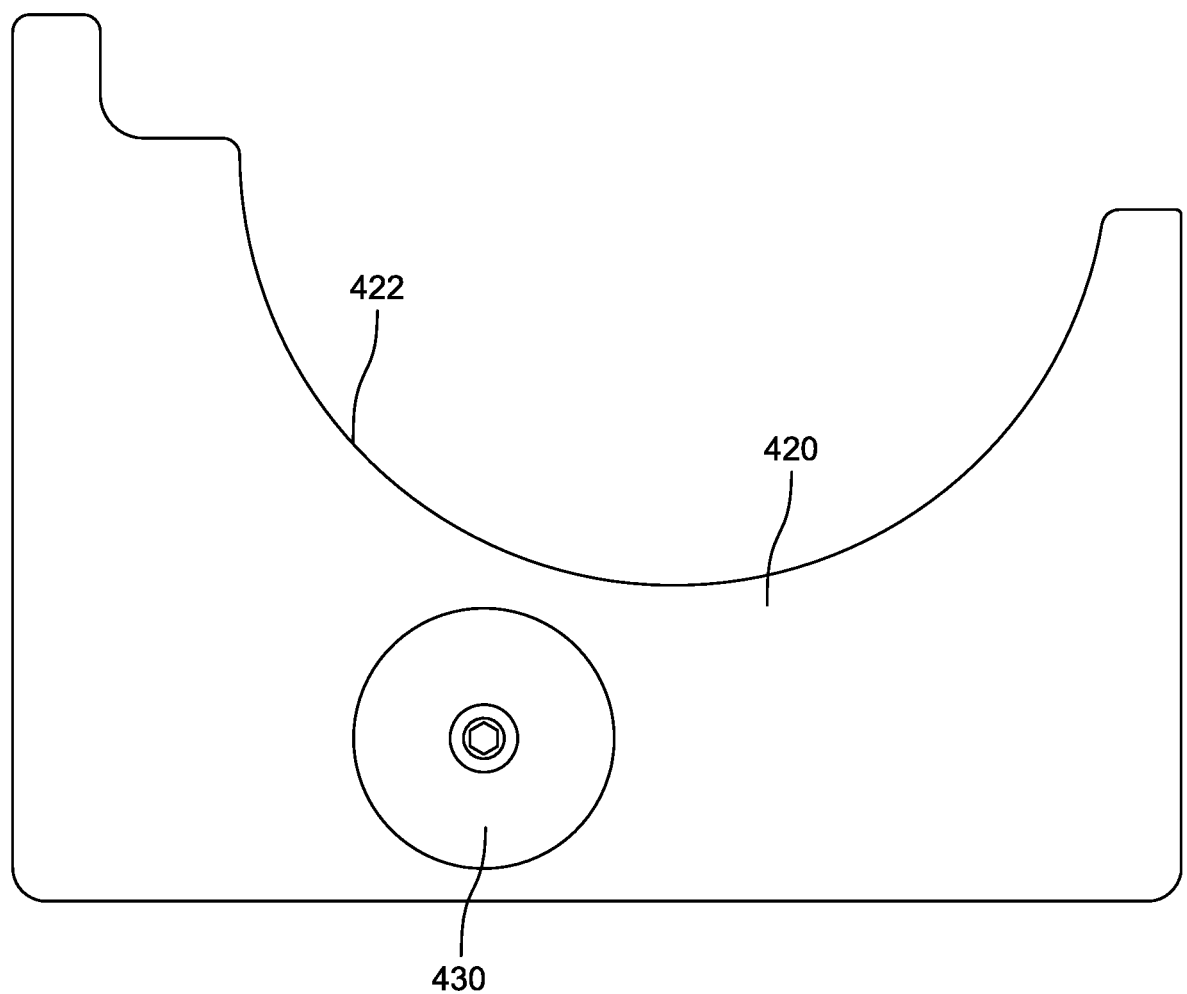
FIG. 20 is a photograph depicting a 5-inch standard half-round outside template.

FIG. 19 is an inside template 400 for a 5-inch standard half-round style gutter, and FIG. 20 is an outside template 420 for a 5-inch standard half-round style gutter. The term "standard half-round" refers to the style gutter illustrated in FIG. 3. The 5-inch standard half-round style inside template 400 is designed such that the perimeter of the inside template 400 mimics the inside dimension and contours of a 5-inch standard half-round style rain gutter. The 5-inch standard half-round style inside template 400 includes at least one metal component 410 secured to the 5-inch standard half-round style inside template 400. The 5-inch standard half-round style outside template 420 is designed such that a portion of the perimeter 422 mimics the outside dimension and contours of a 5-inch standard half-round style rain gutter. The 5-inch standard half-round style outside template 420 includes at least one metal component 430 secured to the 5-inch standard half-round style outside template 420. As is described herein, the metal components 410, 430 are useful in reversibly securing the measurement template 400, 420 to an extension rod 200 via the magnet 250.

Figure 21:
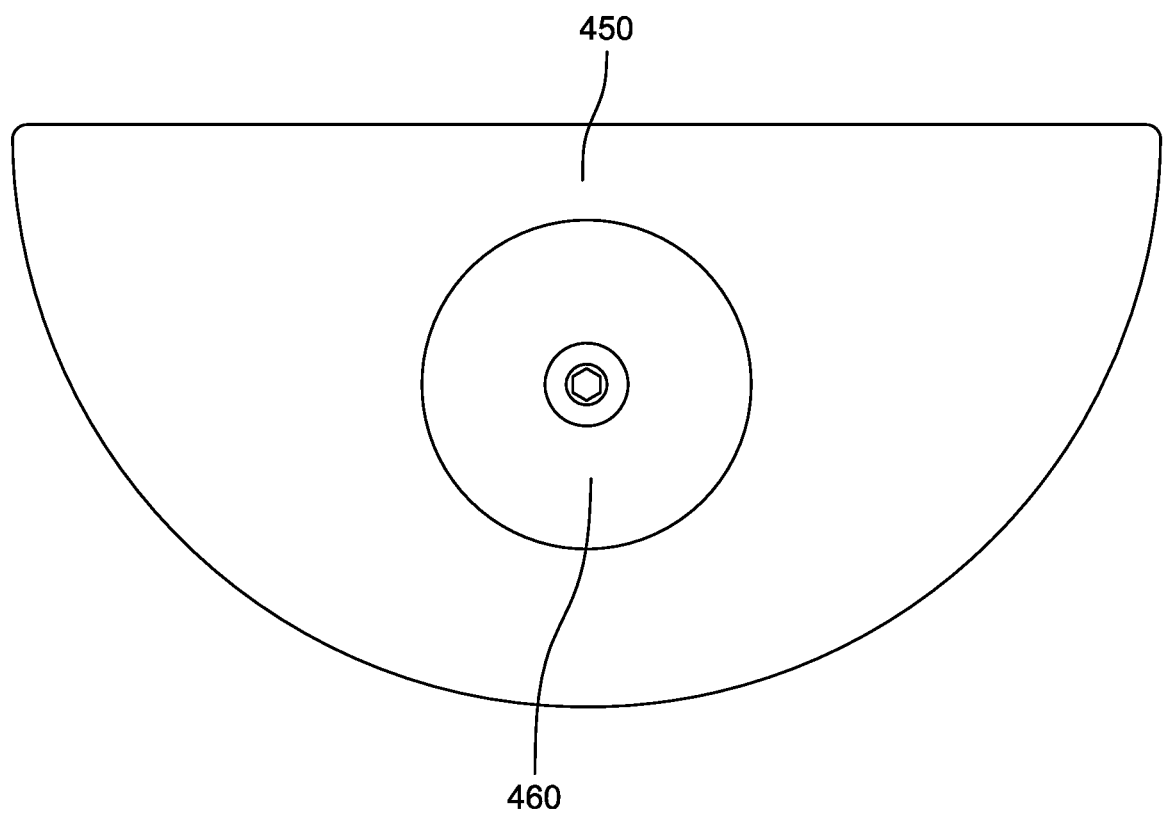
FIG. 21 is a photograph depicting a 6-inch standard half-round inside template.
Figure 22:
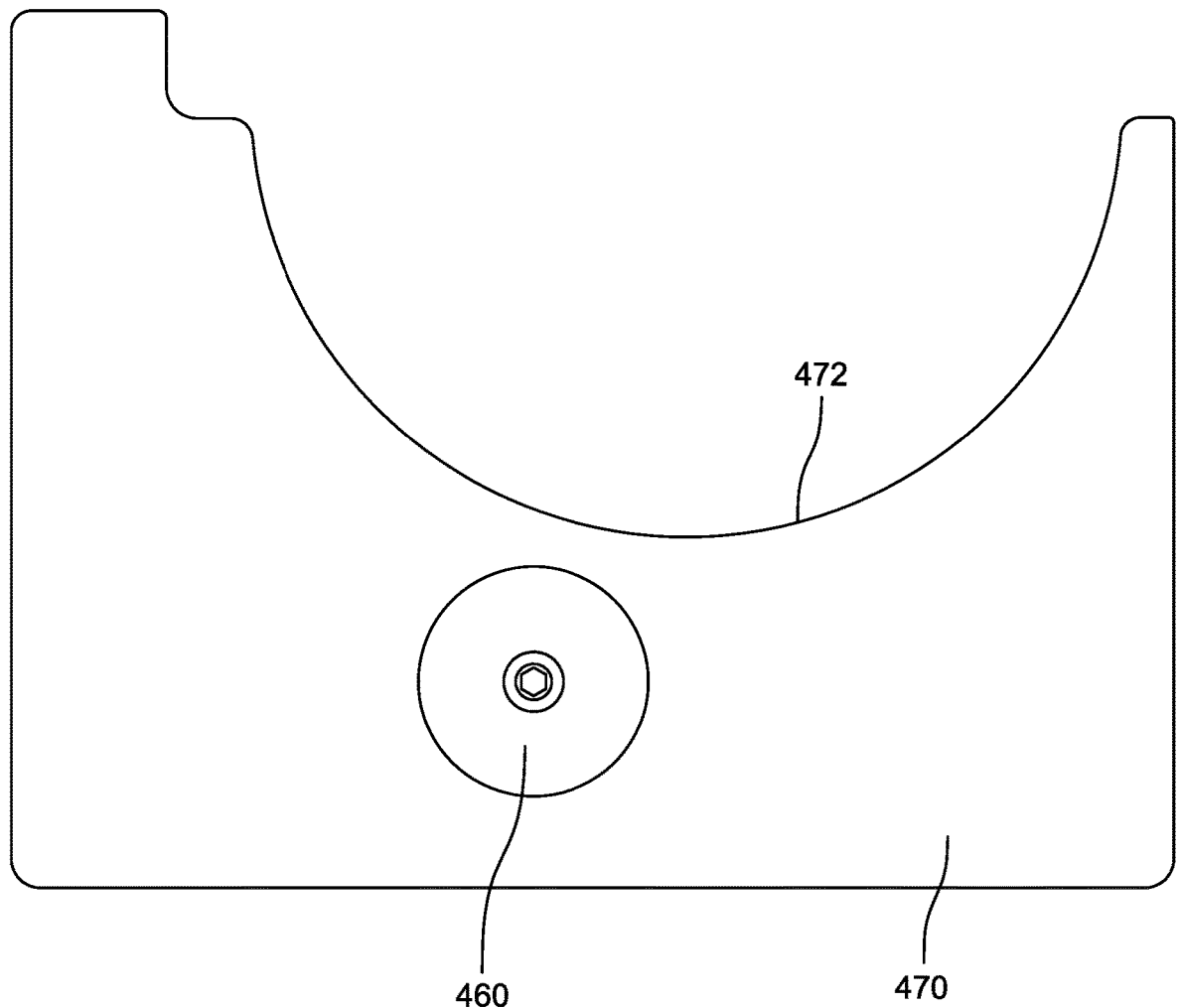
FIG. 22 is a photograph depicting a 6-inch standard half-round outside template.

FIG. 21 is an inside template 450 for a 6-inch standard half-round style gutter, and FIG. 22 is an outside template 470 for a 6-inch standard half-round style gutter. The 6-inch standard half-round style inside template 450 is designed such that the perimeter of the inside template 450 mimics the inside dimension and contours of a 6-inch standard half-round style rain gutter. The 6-inch standard half-round style inside template 450 includes at least one metal component 460 secured to the 6-inch standard half-round style inside template 450. The 6-inch standard half-round style outside template 470 is designed such that a portion of the perimeter 472 mimics the outside dimension and contours of a 6-inch standard half-round style rain gutter. The 6-inch standard half-round style outside template 470 includes at least one metal component 480 secured to the 6-inch standard half-round style outside template 470. As is described herein, the metal components 460, 480 are useful in reversibly securing the measurement template 450, 470 to an extension rod 200 via the magnet 250.

Figure 23:
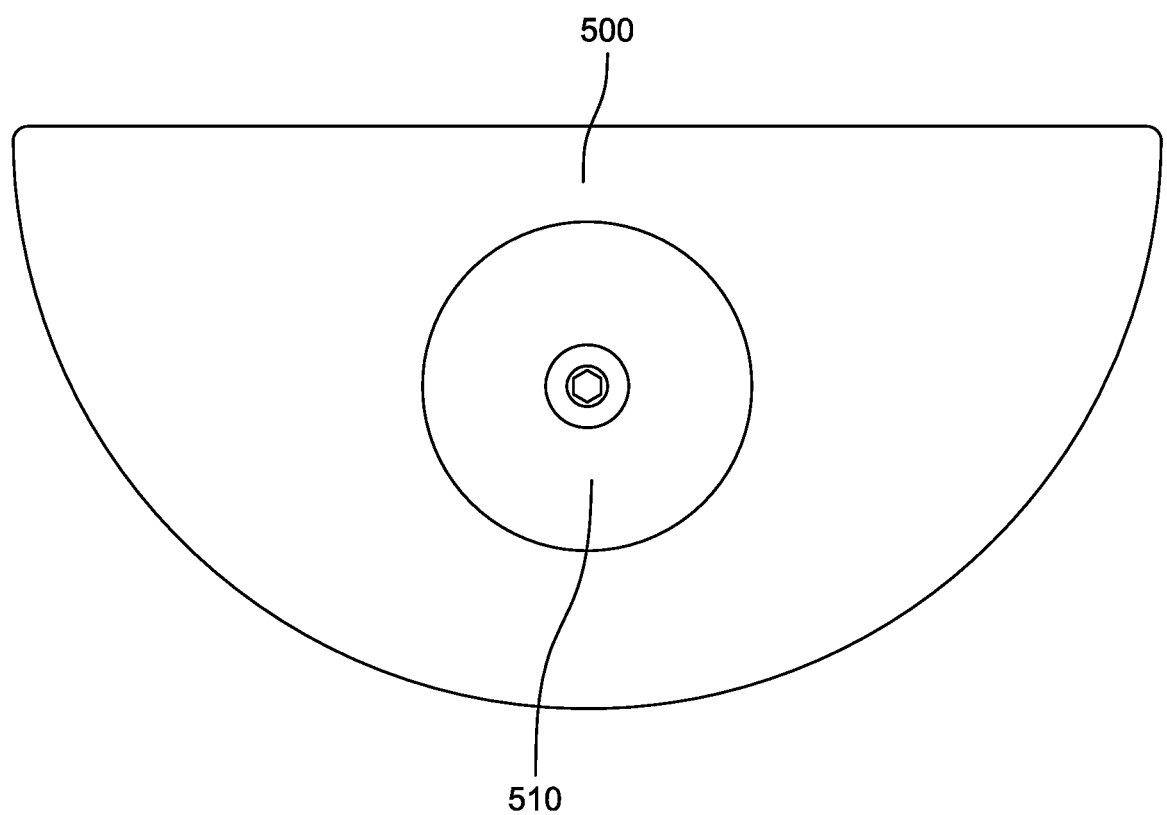
FIG. 23 is a photograph depicting a 6-inch reverse curve half-round inside template.
Figure 24:
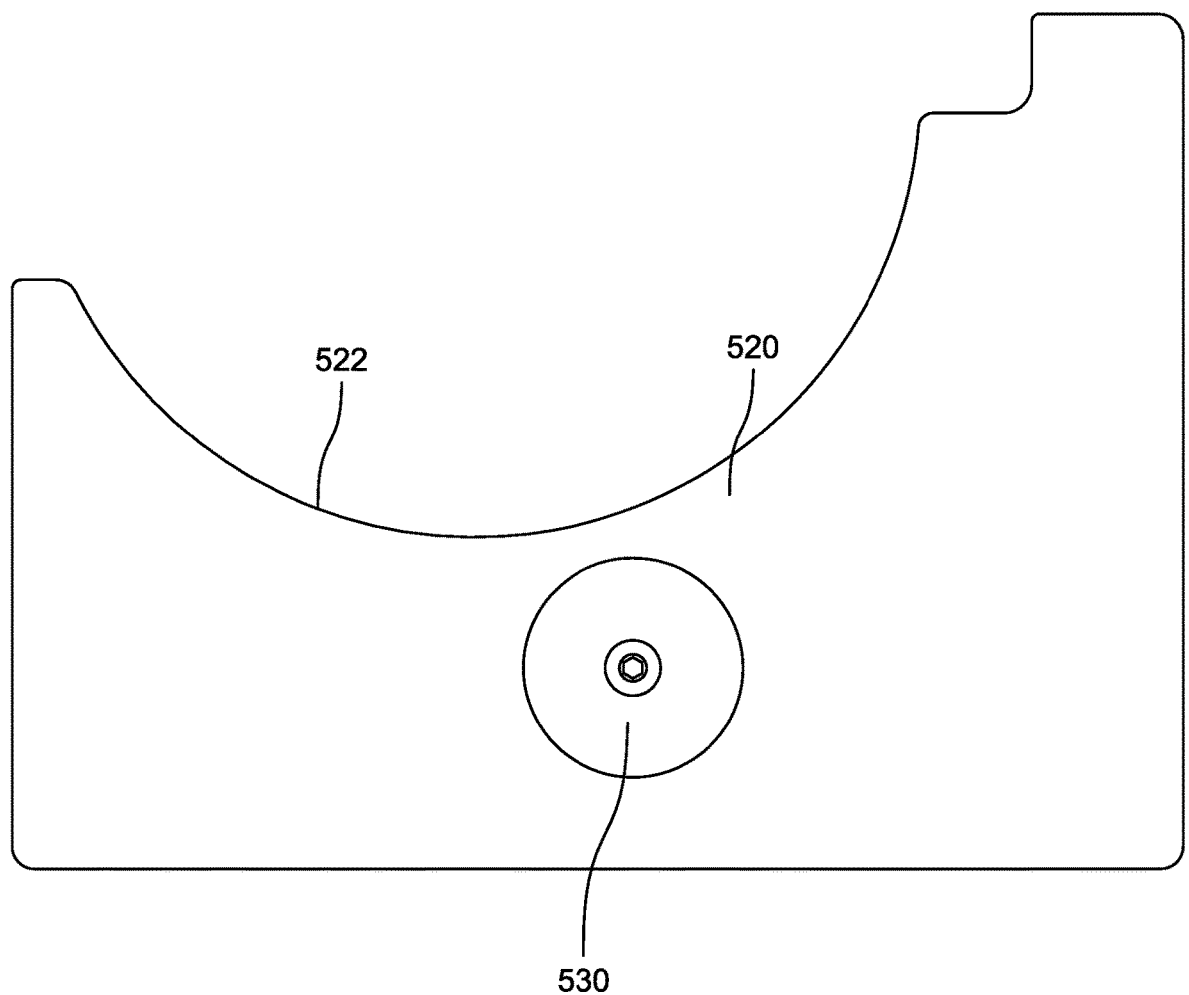
FIG. 24 is a photograph depicting a 6-inch reverse curve half-round outside template.

FIG. 23 is an inside template 500 for a 6-inch reverse curve half-round style gutter, and FIG. 24 is an outside template 520 for a 6-inch reverse curve half-round style gutter.

Figure 2:
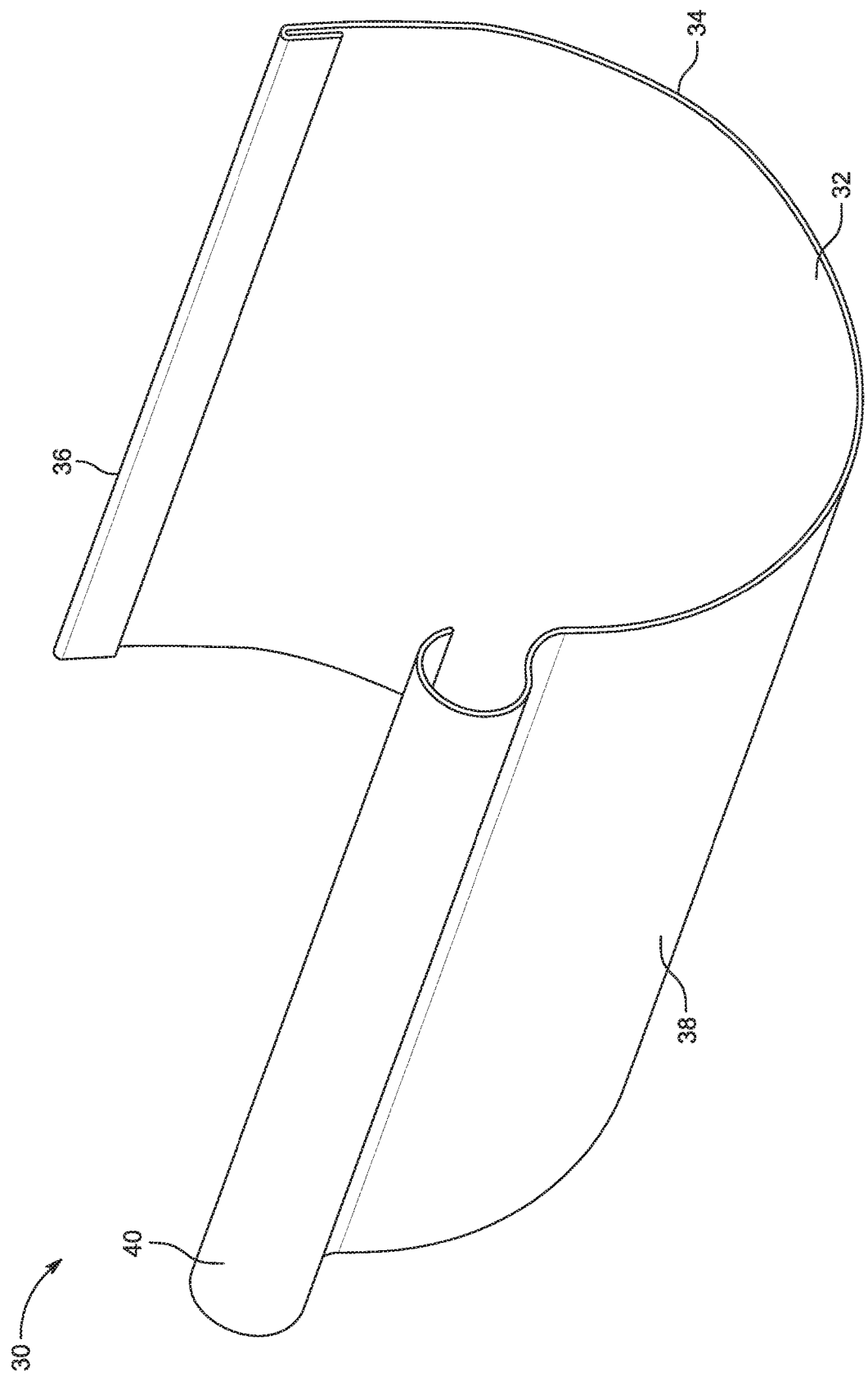
FIG. 2 schematically illustrates a perspective view of an exemplary reverse curve half-round gutter.
Figure 3:
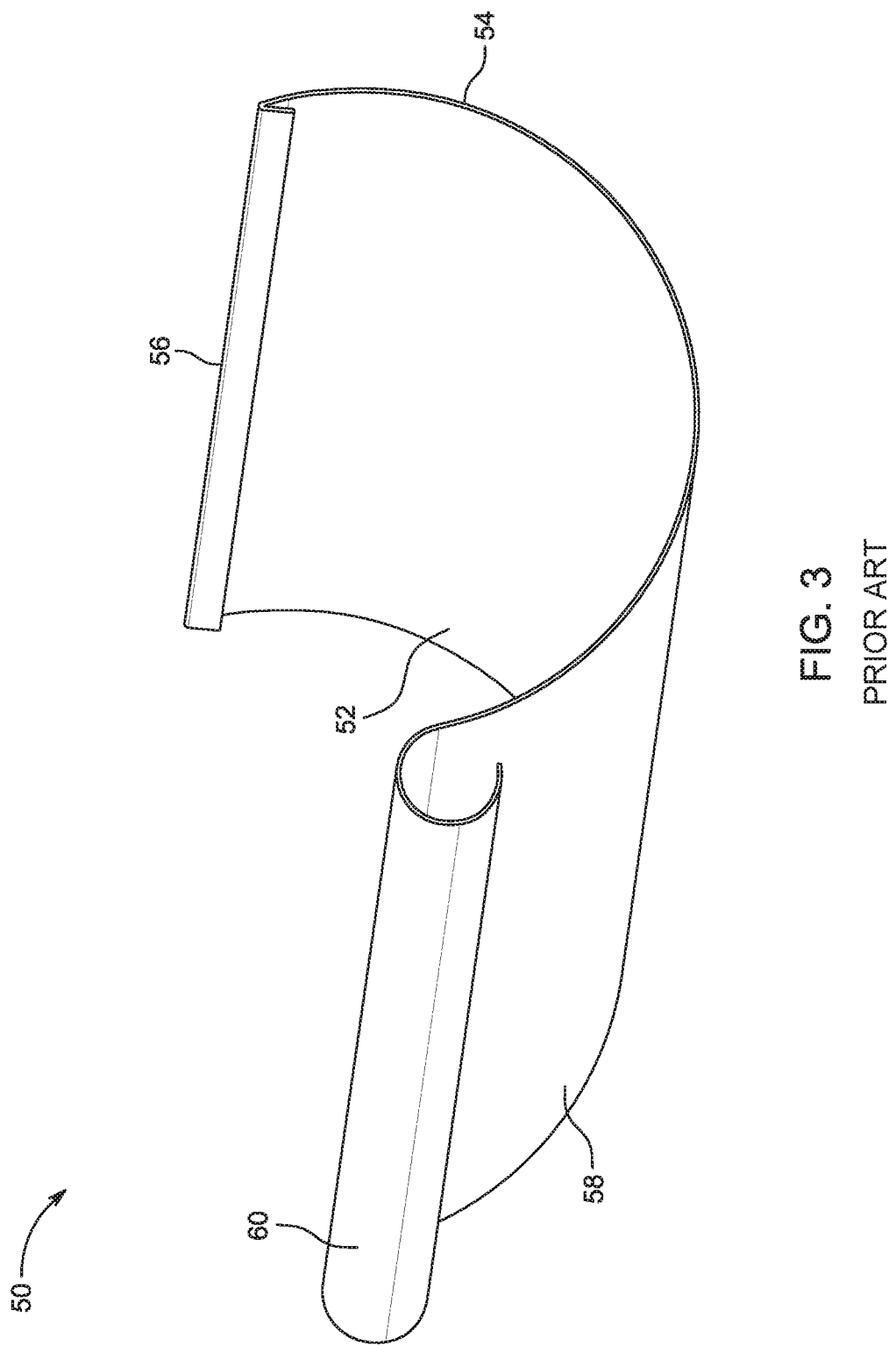
FIG. 3 schematically illustrates a perspective view of an exemplary standard half-round gutter.
Figure 4:
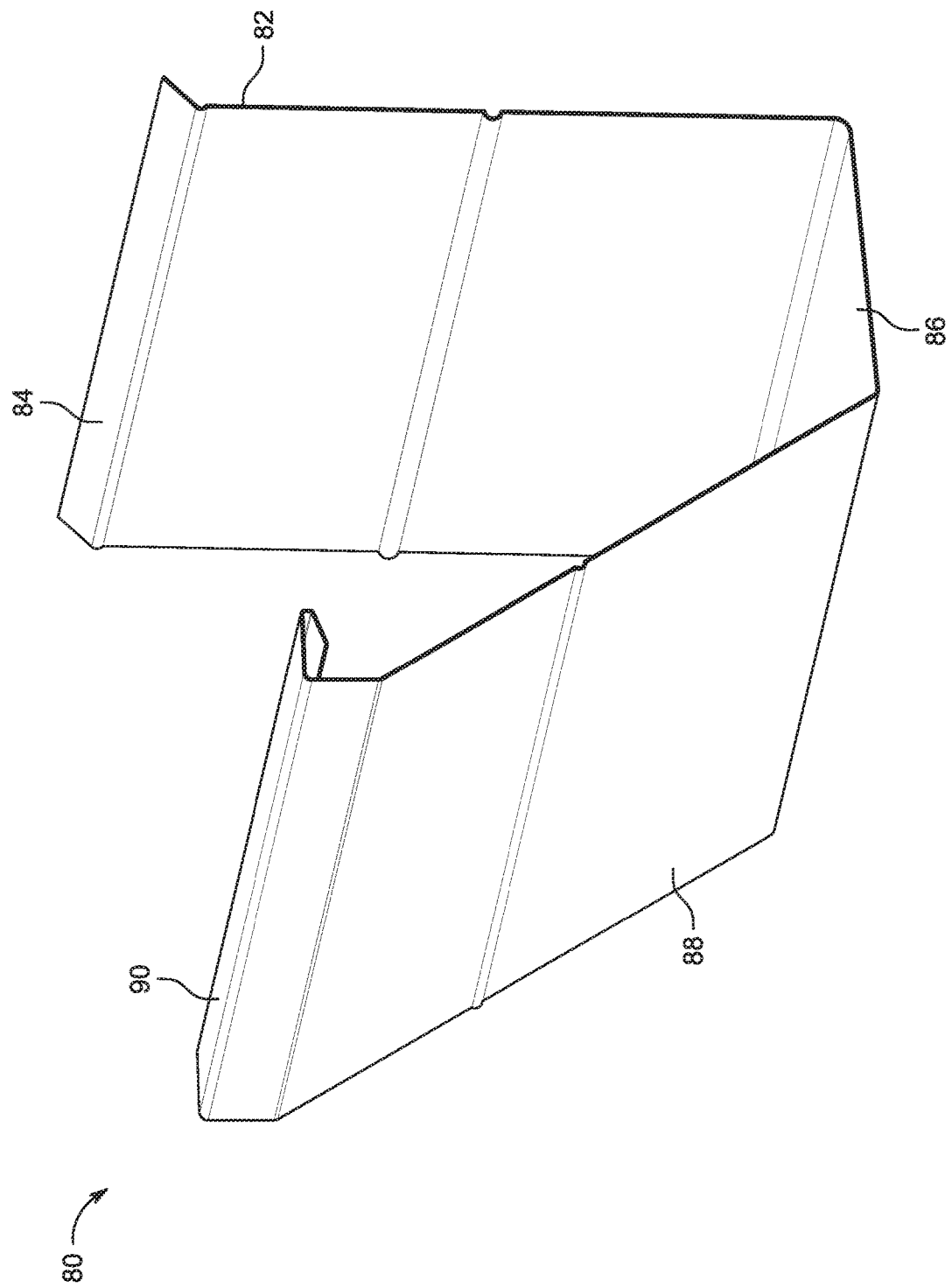
FIG. 4 schematically illustrates a perspective view of an exemplary winged-backed fascia-style gutter.

The term "reverse curve half-round" refers to the style gutter illustrated in FIG. 2. The 6-inch reverse curve half-round style inside template 500 is designed such that the perimeter of the inside template 500 mimics the inside dimension and contours of a 6-inch reverse curve half-round style rain gutter. The 6-inch reverse curve half-round style inside template 500 includes at least one metal component 510 secured to the 6-inch reverse curve half-round style inside template 500. The 6-inch reverse curve half-round style outside template 520 is designed such that a portion of the perimeter 522 mimics the outside dimension and contours of a 6-inch reverse curve half-round style rain gutter. The 6-inch reverse curve half-round style outside template 520 includes at least one metal component 530 secured to the 6-inch reverse curve half-round style outside template 520. As is described herein, the metal components 510, 530 are useful in reversibly securing the measurement template 500, 520 to an extension rod 200 via the magnet 250.

Figure 25:
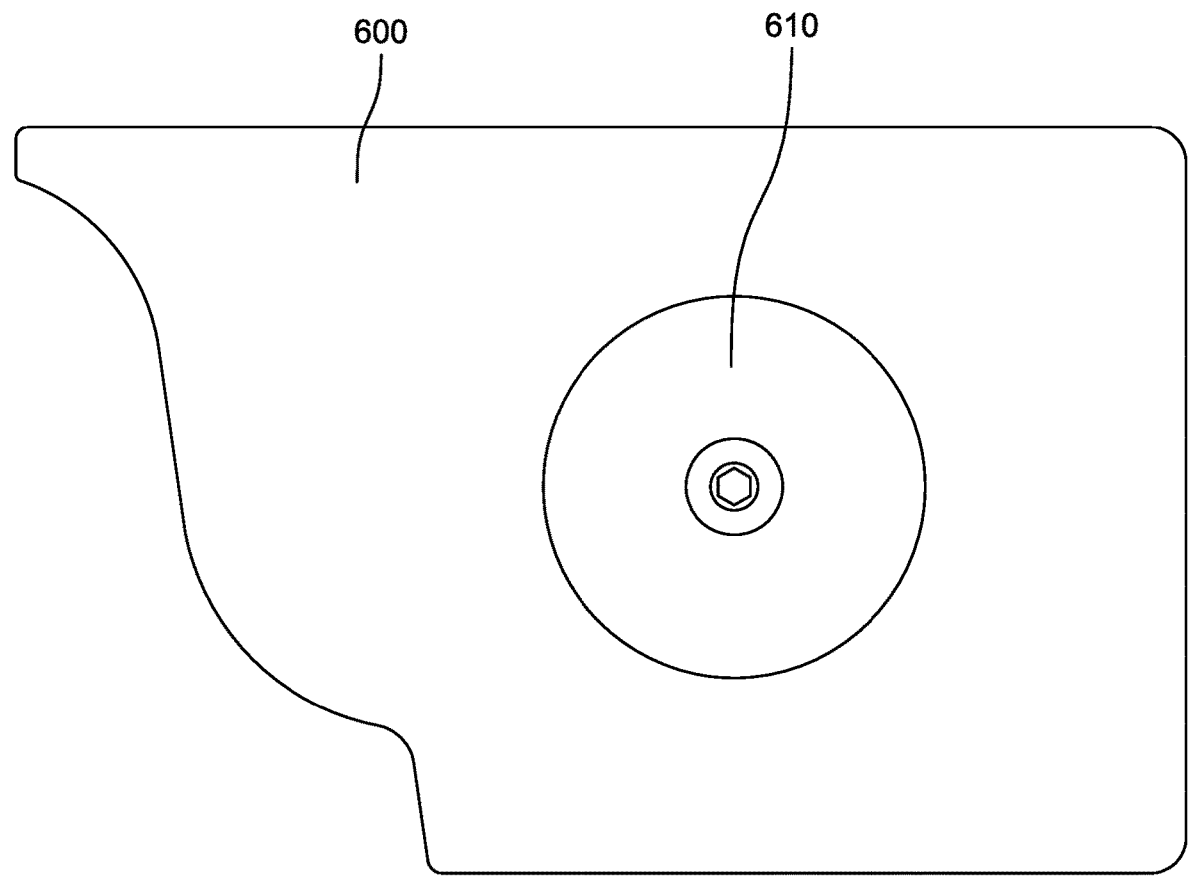
FIG. 25 is a photograph depicting a 5-inch K-style inside template.
Figure 26:
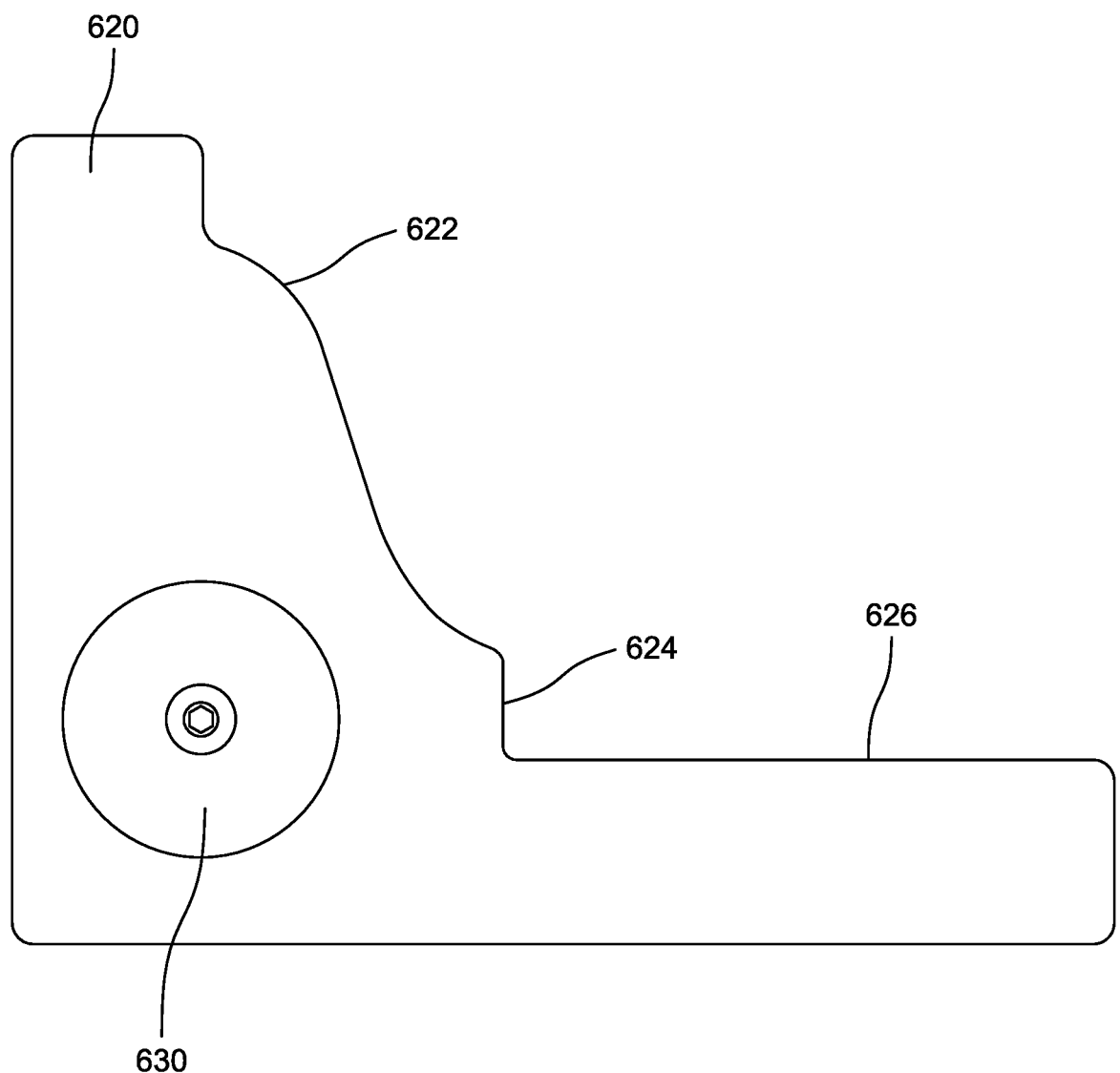
FIG. 26 is a photograph depicting a 5-inch K-style outside template.

FIG. 25 is an inside template 600 for a 5-inch K-style gutter, and FIG. 26 is an outside template 620 for a 5-inch K-style gutter. The 5-inch K-style inside template 600 is designed such that the perimeter of the inside template 600 mimics the inside dimension and contours of a 5-inch K-style rain gutter. The 5-inch K-style inside template 600 includes at least one metal component 610 secured to the 5-inch K-style inside template 600. The 5-inch K-style outside template 620 is designed such that portions of the perimeter 622, 624, and 626 mimic the outside dimension and contours of a 5-inch K-style rain gutter. The 5-inch K-style outside template 620 includes at least one metal component 630 secured to the 5-inch K-style outside template 620. As is described herein, the metal components 610, 630 are useful in reversibly securing the measurement template 600, 620 to an extension rod 200 via the magnet 250.

Figure 27:
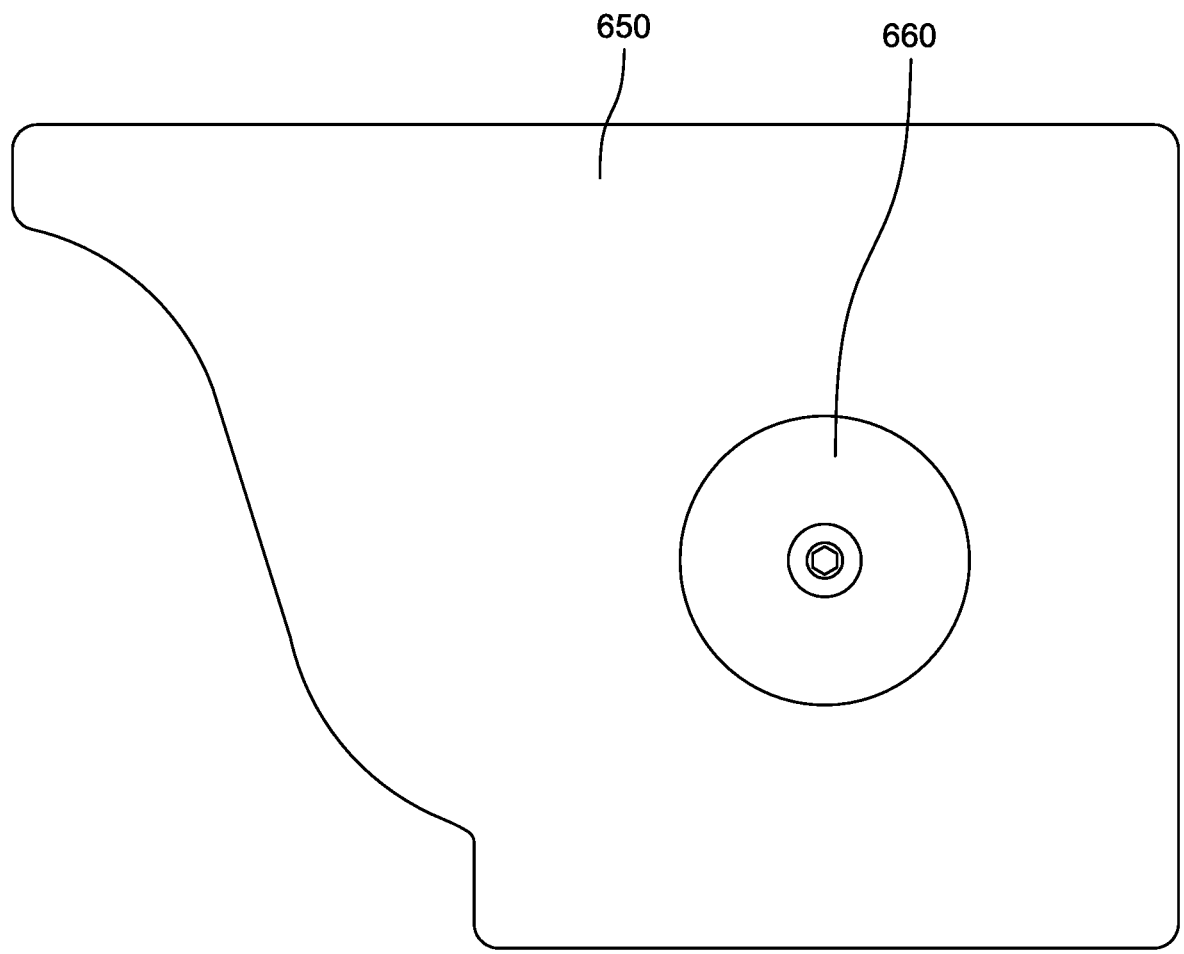
FIG. 27 is a photograph depicting a 6-inch K-style inside template.
Figure 28:
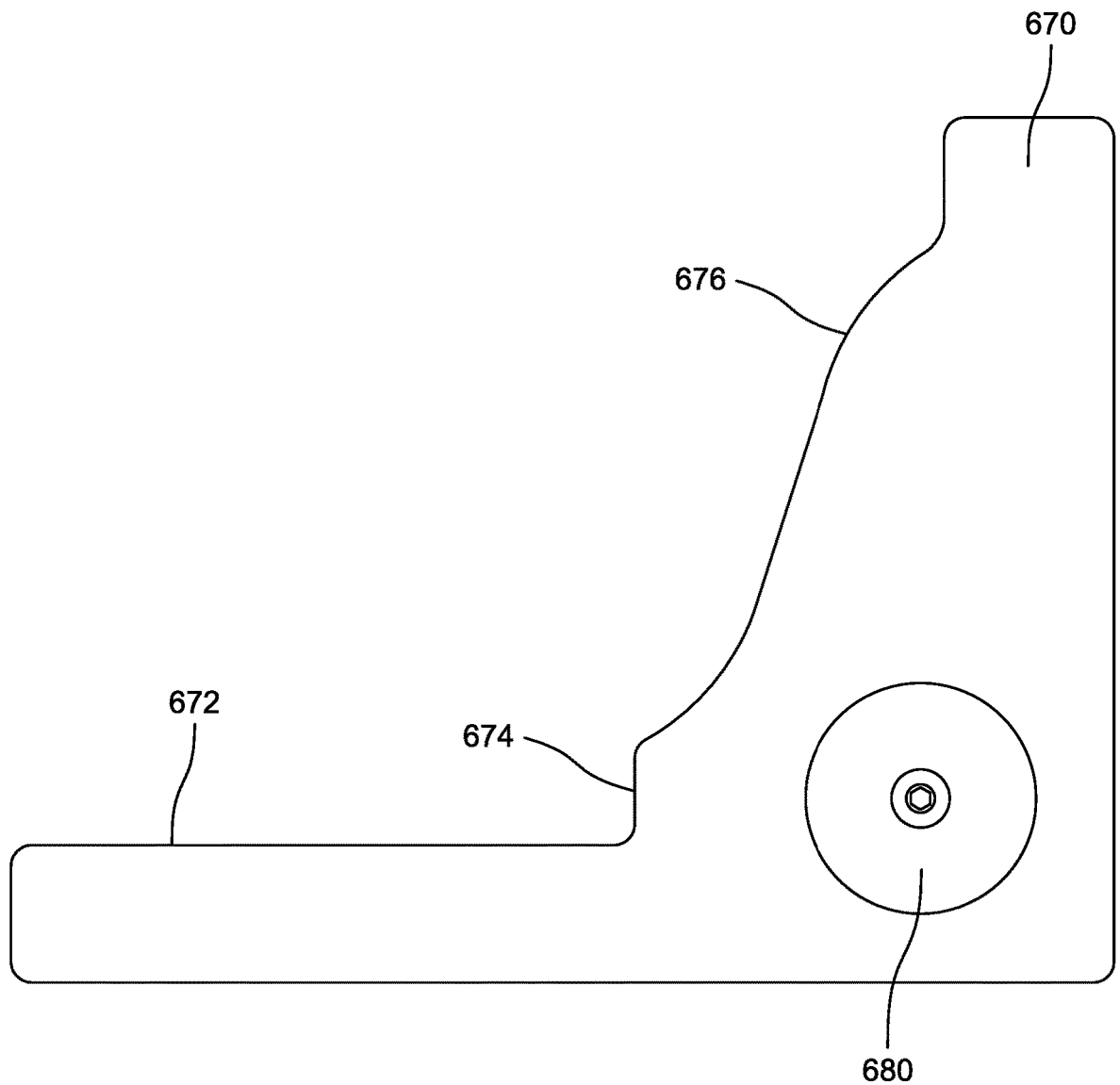
FIG. 28 is a photograph depicting a 6-inch K-style outside template.

FIG. 27 is an inside template 650 for a 6-inch K-style gutter, and FIG. 28 is an outside template 670 for a 6-inch K-style gutter. The 6-inch K-style inside template 650 is designed such that the perimeter of the inside template 650 mimics the inside dimension and contours of a 6-inch K-style rain gutter. The 6-inch K-style inside template 650 includes at least one metal component 660 secured to the 6-inch K-style inside template 650. The 6-inch K-style outside template 670 is designed such that portions of the perimeter 672, 674, and 676 mimic the outside dimension and contours of a 6-inch K-style rain gutter. The 6-inch K-style outside template 670 includes at least one metal component 680 secured to the 6-inch K-style outside template 670. As is described herein, the metal components 660, 680 are useful in reversibly securing the measurement template 650, 670 to an extension rod 200 via the magnet 250.

Figure 29:
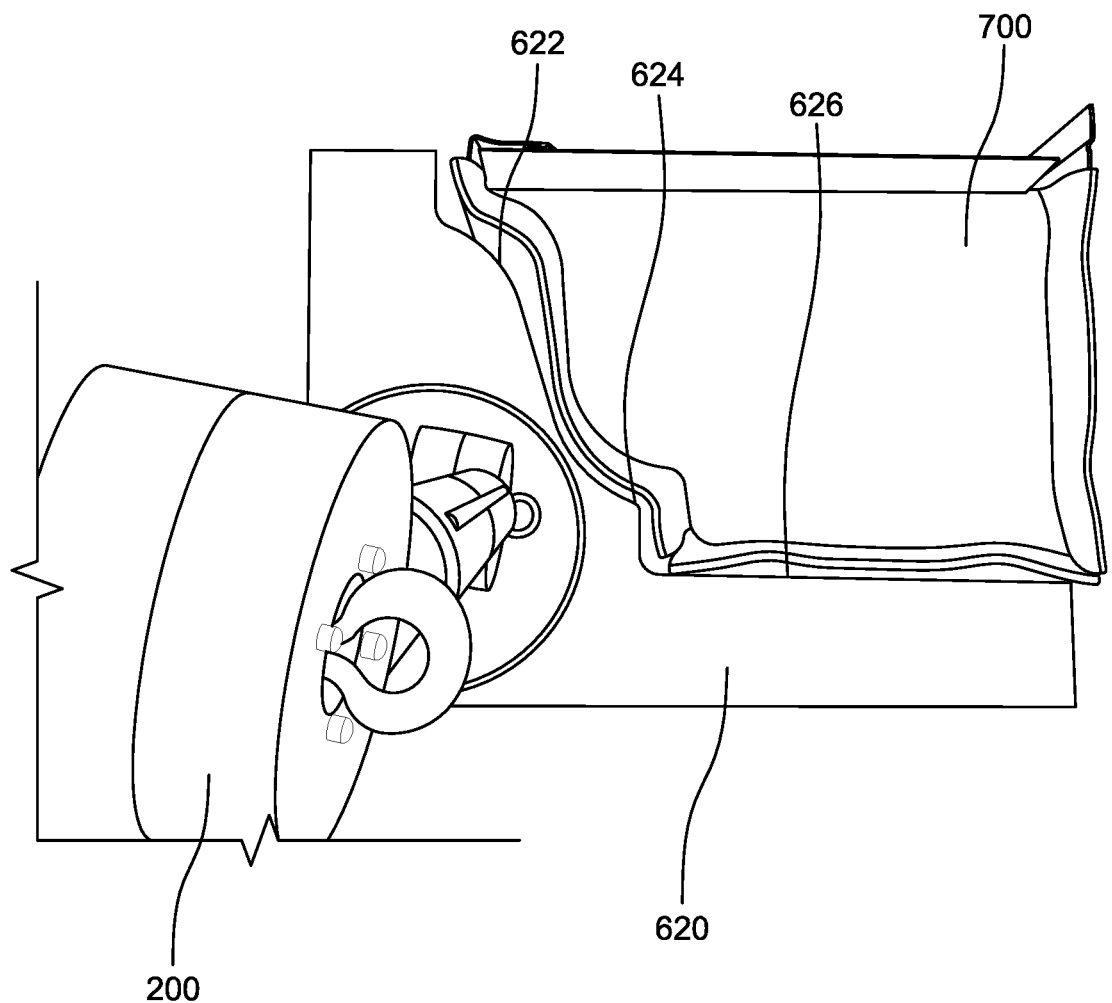
FIG. 29 is a photograph depicting an outside measurement template engaged with a rain gutter and used to assess the rain gutter.

FIG. 29 illustrates the use of an outside measurement template, in this instance, a 5-inch K-style outside template 620, to assess a rain gutter. As is illustrated, portions 622, 624, and 626 of the perimeter of the 5-inch K-style outside template 620 conforms to the outside dimensions and contours of the 5-inch K-style rain gutter. If this were not a 5-inch K-style rain gutter, the 5-inch K-style outside template 620 would not conform to the outside dimensions and contours of the 5-inch K-style rain gutter, and a repairperson, installer, or salesperson would try a different measurement template. The different measurement templates can include easily recognizable indicia to distinguish the templates from one another. For example, coloration or symbols can be included on the measurement templates to depict the style and/or the size of the gutter conforming to the measurement template.

Figure 30:
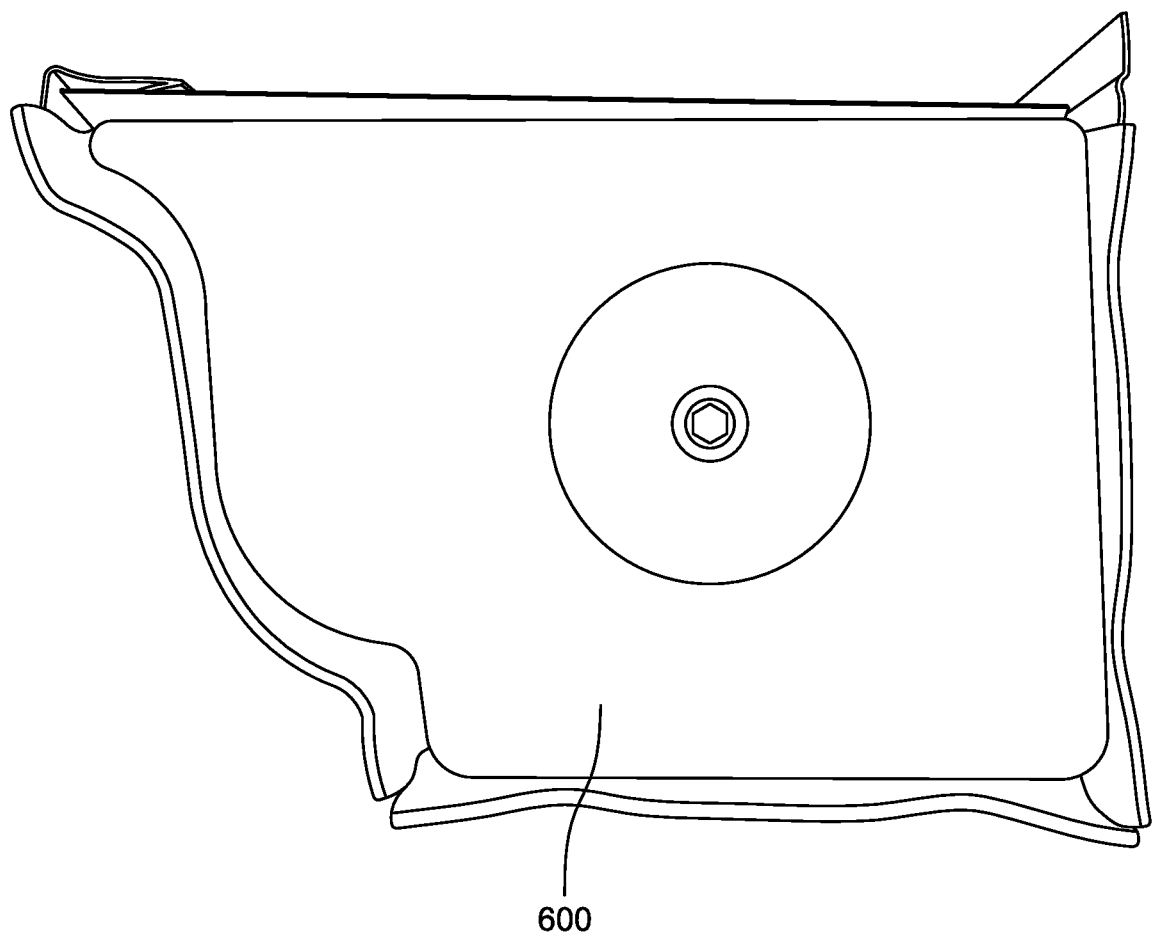
FIG. 30 is a photograph depicting an inside measurement template engaged with a rain gutter and used to assess the rain gutter.
Figure 31:
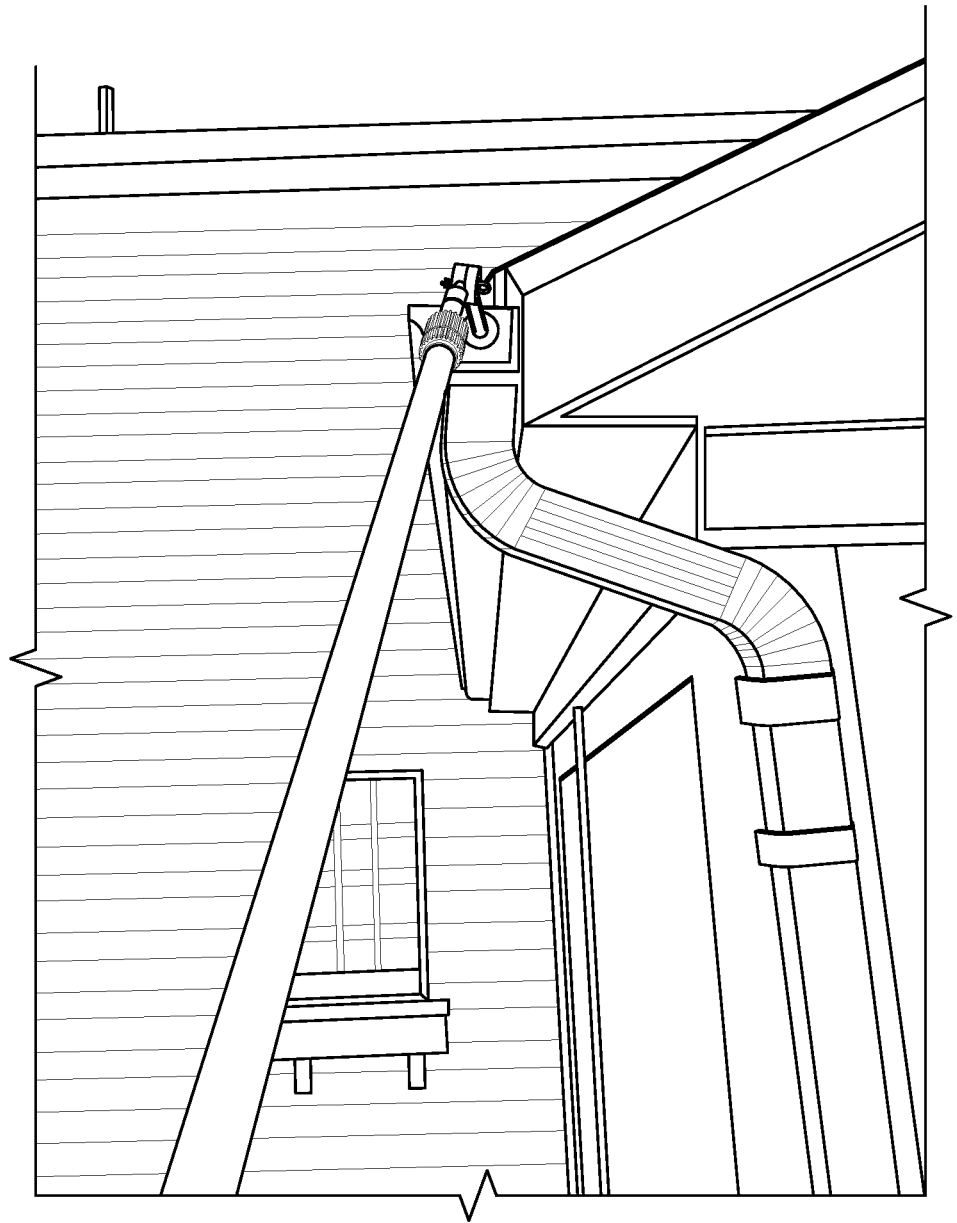
FIG. 31 is another photograph depicting an inside measurement template engaged with a rain gutter used to assess the rain gutter.
Figure 32:
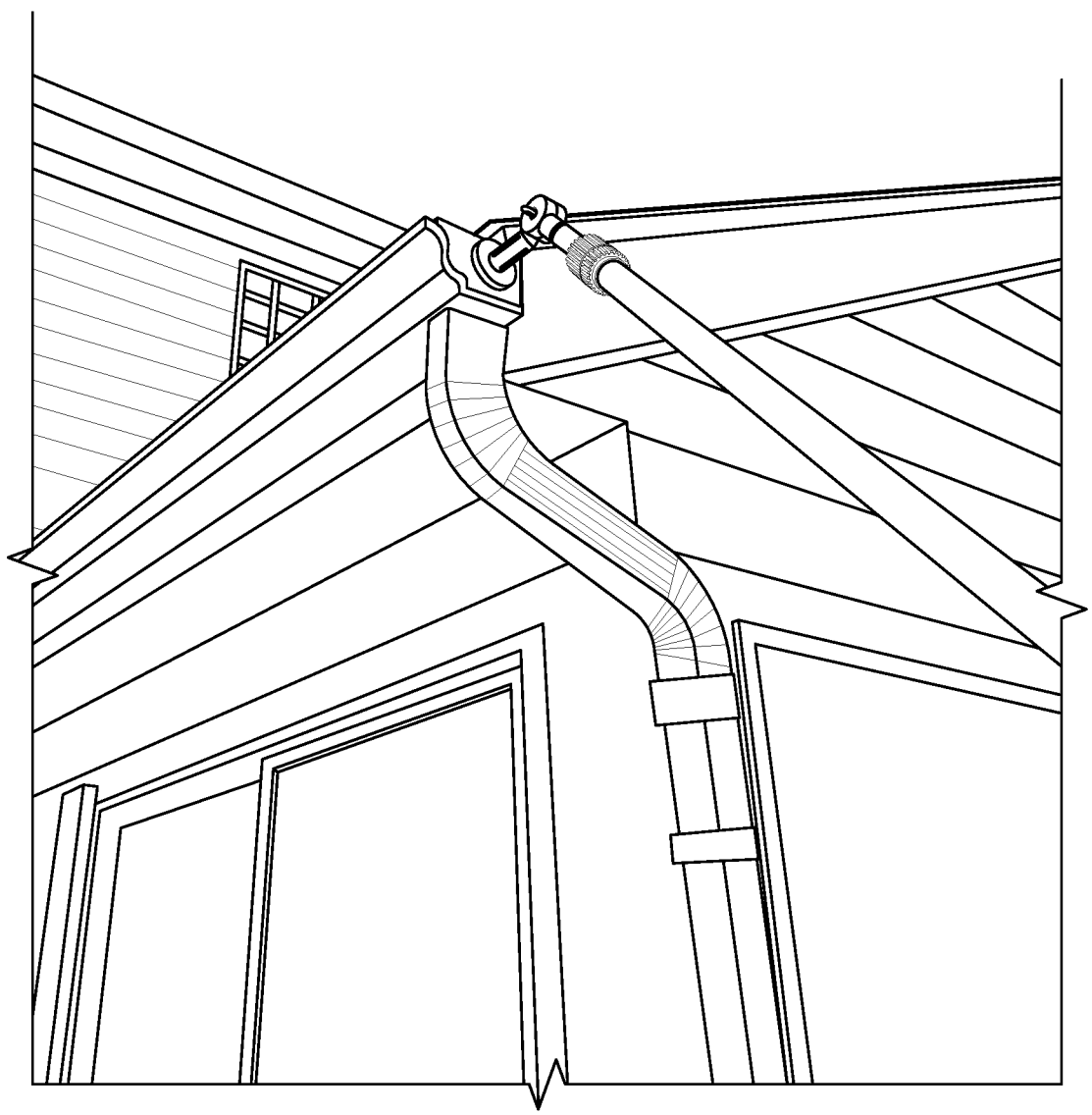
FIG. 32 is yet another photograph depicting an inside measurement template engaged with a rain gutter and used to assess the rain gutter.
Figure 33:
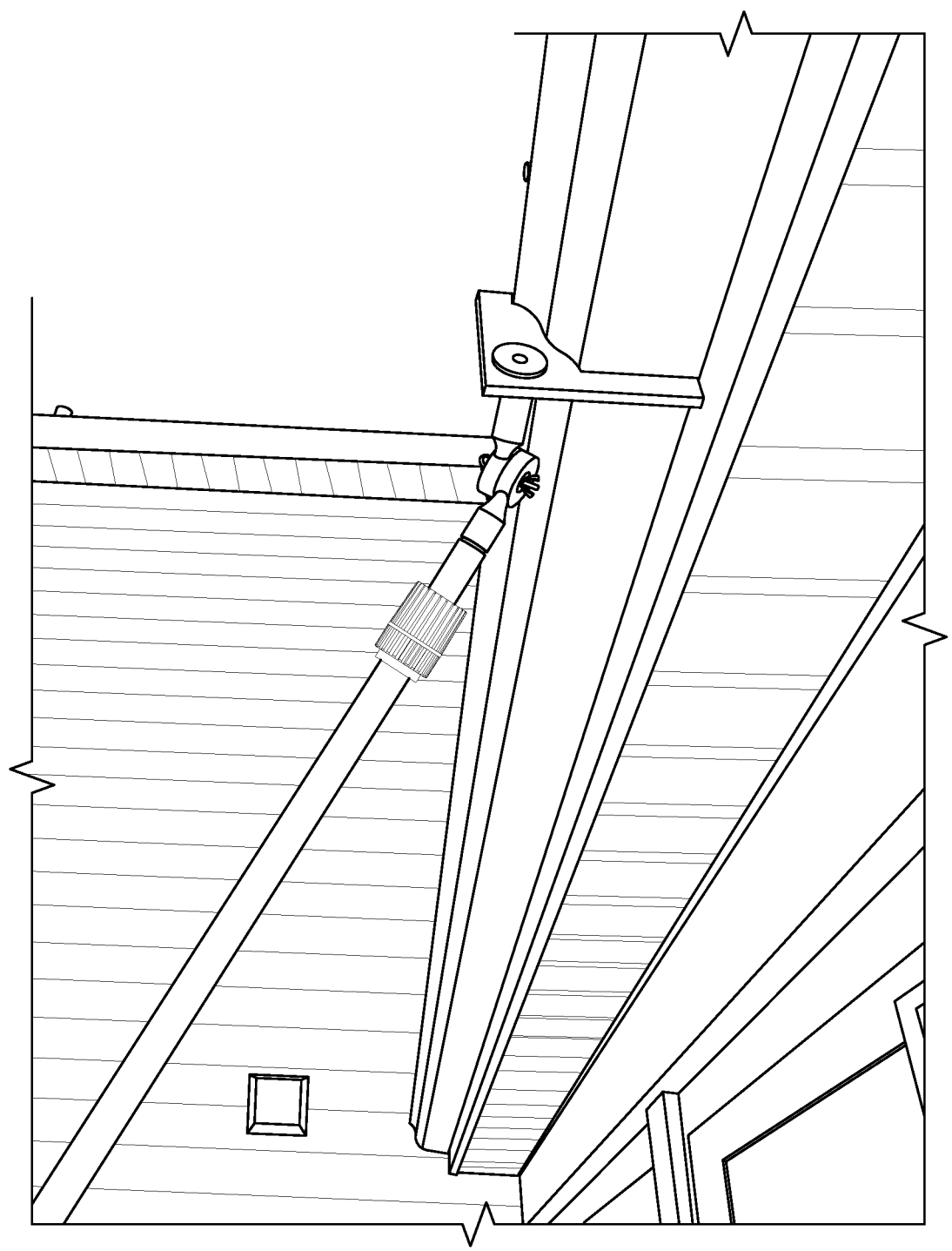
FIG. 33 is a photograph depicting an outside measurement template engaged with a rain gutter and used to assess the rain gutter.
Figure 34:
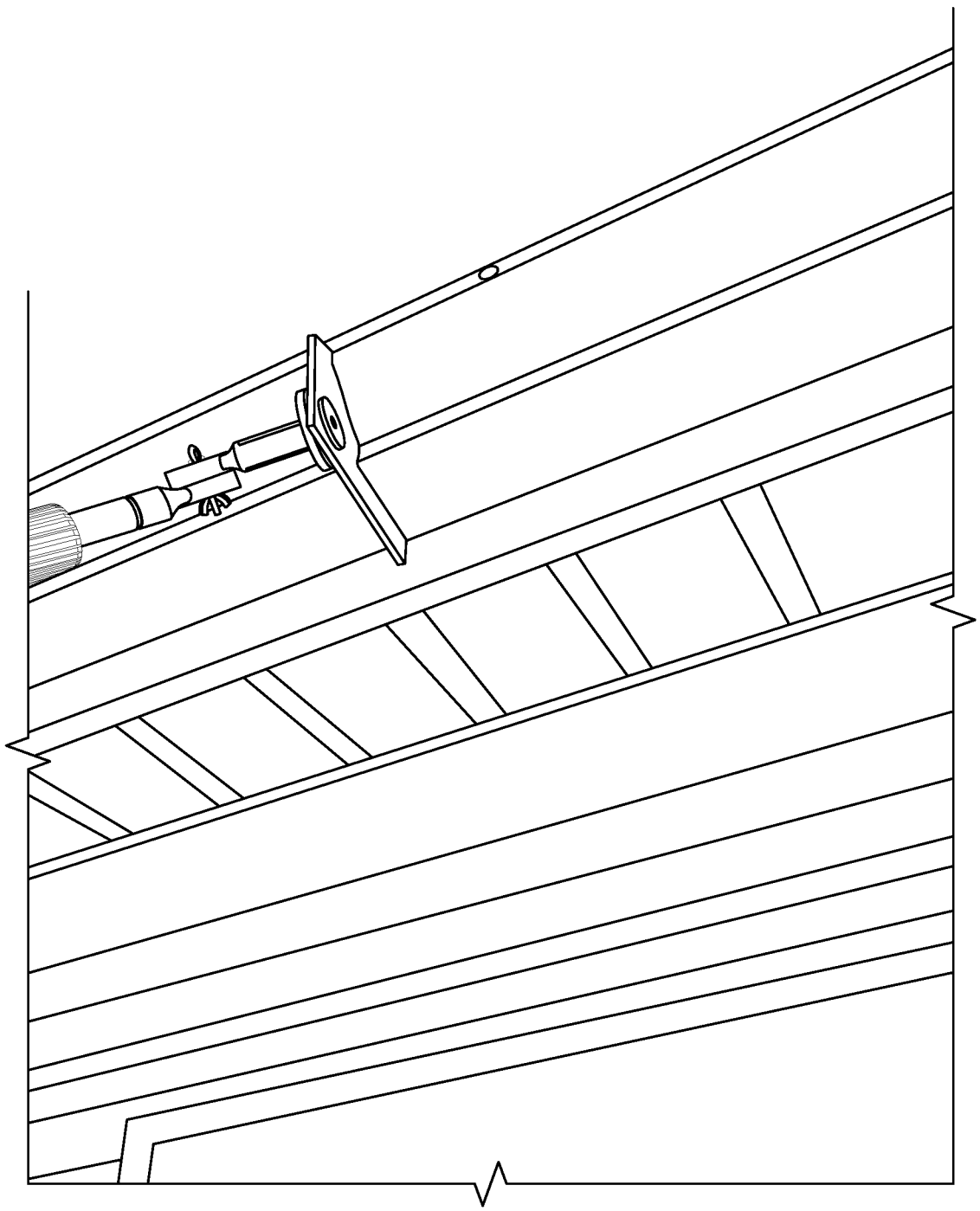
FIG. 34 is another photograph depicting an outside measurement template engaged with a rain gutter and used to assess the rain gutter.

As illustrated in FIG. 29, the endcap 700 of the 5-inch K-style rain gutter is recessed and is representative of the dimensions and contours of the inside of the 5-inch K-style rain gutter. Thus, as illustrated in FIG. 30, a 5-inch K-style inside template 600 can be placed within the recess of the endcap 700 to assess the size and style of the rain gutter. As illustrated, the perimeter of the 5-inch K-style inside template 600 conforms to the endcap 700 of the 5-inch K-style rain gutter. FIGS. 31-34 illustrate the gutter assessment system used to assess rain gutters installed on a residential home.

Additional accessories can be used with the expansion rod 200. For example, a camera or recorder can be attached to the head 210 of the expansion rod 200, and the expansion rod 200 can be extended such that the camera is proximate to a rain gutter. The camera can capture images and/or video of the outside or inside of the gutters. Such images can be used to assess damage to the gutter or if the inside of the gutter is clogged with debris. In another example, cleaning tools can be attached to the extension rod 200 to clean out such debris if found in the rain gutter.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

I claim:

1. A method of assessing rain gutters comprising the steps of:
   providing a plurality of templates for assessing a variety of rain gutters;
   providing an extension rod;
   securing a first template of the plurality of templates to the extension rod;
   engaging the first template with the rain gutter;
   observing the engagement of the first template with the rain gutter; and
   determining if the first template conforms to contours of the rain gutter.

2. The method of claim 1, wherein the plurality of templates includes:
   at least one template to assess a K-style rain gutter;
   at least one template to assess a fascia style rain gutter;
   at least one template to assess a standard half-round rain gutter; and
   at least one template to assess a half-round reverse curve rain gutter.

3. The method of claim 1, wherein the plurality of templates includes:
   at least one template to assess a four inch rain gutter;
   at least one template to assess a four and one-half inch rain gutter;
   at least one template to assess a five inch rain gutter; and
   at least one template to assess a six inch rain gutter.

4. The method of claim 1, wherein the extension rod includes a magnet and each of the plurality of templates includes a metal component.

5. The method of claim 4, wherein the step of securing a first template of the plurality of templates to the extension rod includes placing the metal component of the first template in contact with the magnet of the extension rod.

6. The method of claim 1, wherein the plurality of templates includes:
- at least one inside template arranged to generally match an inside dimensions and contours of a first rain gutter; and
- at least one outside template arranged to generally match an outside dimensions and contours of the first rain gutter.

7. The method of claim 6, wherein the extension rod comprises:
- a head assembly comprising:
  - a pivot feature;
  - a first securing mechanism; and
  - an arm connecting the pivot feature and the first securing mechanism.

8. The method of claim 7, wherein the at least one inside template includes a second securing mechanism and the at least one outside template includes a third securing mechanism.

9. The method of claim 8, wherein:
- the first securing mechanism is a magnet;
- the second securing mechanism includes a first metal component; and
- the third securing mechanism includes a second metal component.

10. The method of claim 9, wherein:
- the second securing mechanism further includes a third metal component, where the first metal component is secured to a first face of the at least one inside template and the third metal component is secured to a second and opposite face of the at least one inside template; and
- the third securing mechanism further includes a fourth metal component, where the second metal component is secured to a first face of the at least one outside template and the fourth metal component is secured to a second and opposite face of the at least one outside template.

11. The method of claim 1, wherein the plurality of templates includes:
- at first inside template arranged to generally match an inside dimensions and contours of a first rain gutter;
- at second inside template arranged to generally match an inside dimensions and contours of a second rain gutter;
- at first outside template arranged to generally match an outside dimensions and contours of the first rain gutter; and
- at second outside template arranged to generally match an outside dimensions and contours of the second rain gutter.

12. The method of claim 11, where the first rain gutter and second rain gutter are of different styles.

13. The method of claim 11, where the first rain gutter and second rain gutter are of different sizes.

* * * * *